United States Patent [19]
Matsuoka et al.

[11] Patent Number: 5,404,729
[45] Date of Patent: Apr. 11, 1995

[54] HEAT PUMP TYPE AIR CONDITIONER FOR AUTOMOTIVE VEHICLE

[75] Inventors: Takayoshi Matsuoka; Yasuhiro Masumura; Toshio Ohashi, all of Kanagawa, Japan

[73] Assignee: Nissan Motor Co., Ltd., Yokohama, Japan

[21] Appl. No.: 995,096

[22] Filed: Dec. 22, 1992

[30] Foreign Application Priority Data

Dec. 27, 1991 [JP] Japan .................. 3-345950
Oct. 5, 1992 [JP] Japan .................. 4-266089

[51] Int. Cl.6 ............................................. F25B 41/00
[52] U.S. Cl. .................................. 62/179; 62/90; 62/196.4
[58] Field of Search .............. 62/160, 324.6, 324.1, 62/90, 196.4, 173, 179

[56] References Cited

U.S. PATENT DOCUMENTS

| | | | |
|---|---|---|---|
| 3,012,411 | 12/1961 | Kjellman | 62/90 X |
| 3,402,564 | 9/1968 | Nussbaum | 62/173 |
| 4,324,286 | 4/1982 | Brett | 62/90 X |
| 4,920,756 | 5/1990 | Howland et al. | 62/90 X |

FOREIGN PATENT DOCUMENTS

| | | | |
|---|---|---|---|
| 2700634 | 7/1978 | Germany | 62/90 |
| 0103727 | 5/1988 | Japan | 62/90 |
| 2-130808 | 10/1990 | Japan | |
| 2-290475 | 11/1990 | Japan | |

*Primary Examiner*—William E. Wayner
*Attorney, Agent, or Firm*—Lowe, Price, LeBlanc & Becker

[57] ABSTRACT

A heat pump type air conditioner for an automotive vehicle has a compressor to which an outer heat exchanger and a first inner heat exchanger are connected through a three-way valve. The outer heat exchanger is connected at its refrigerant outlet to the first inner heat exchanger through one-way valve. The refrigerant outlet of the first inner heat exchanger is connected to a second inner heat exchanger through an expansion valve. The refrigerant outlet of the second inner heat exchanger is connected to the compressor. The second and first inner heat exchangers are disposed in turn downstream of a blower for generating an air flow for air-conditioning a passenger compartment of the vehicle. During a cooling drive the three-way valve is set to lead the refrigerant from the compressor to the outer heat exchanger. During a heating drive the three-way valve is set to direct the refrigerant from the compressor to the first inner heat exchanger while bypassing the outer heat exchanger. As a result, the air-conditioning capacity of the air conditioner is improved without changing the direction of refrigerant flow to the cooling and heating drive.

14 Claims, 19 Drawing Sheets

|  | LOW-TEMP. START | INITIAL STAGE OF WARM-UP | AFTER INITIAL STAGE OF WARM-UP | STABLE STAGE |
|---|---|---|---|---|
| FOOT DOOR | 0 | Xfa | Xfa → 100 | 100 |
| RETURN DOOR | 100 | 100 | 100 → 0 | 0 |

HEAT PUMP TYPE AIR CONDITIONER FOR AUTOMOTIVE VEHICLE

BACKGROUND OF THE INVENTION

1. Field of the Invention

The present invention relates to improvements in a heat pump type air conditioner applied to an automotive vehicle, and more particularly to an improvement of a working capacity of a heat pump type air conditioner.

2. Description of the Prior Art

It is well known that a heat pump type air conditioner is applied to an automotive vehicle and provided with a four-way valve for changing refrigerant flow in a heating drive and a cooling drive. During the heating drive, an outer heat exchanger is used as a heat absorber and an inner heat exchanger is used as a radiator. On the other hand, during the cooling drive, the outer heat exchanger is used as a radiator and the inner heat exchanger is used as a heat absorber. Such a heat pump type air conditioner is disclosed, for example, in Japanese Patent Provisional Publication No. 2-290475 and Japanese Utility Model Provisional Publication No. 2-130808.

As shown in FIG. 22, during a heating drive a four-way valve 2 is set as indicated by a continuous line in FIG. 22 and refrigerant is circulated as follows: A compressor 1→the four-way valve 2→a first inner heat exchanger 3→heating heat exchanger 4→a second inner heat exchanger 5→an expansion valve 6→an outer heat exchanger 7→the four-way valve 2→receiver 8→the compressor 1. Accordingly, the heat of the refrigerant is transmitted to air, led by a blower fan 9 and used for heating a passenger compartment. The heat from an engine 10 is transmitted to the refrigerant through the heating heat exchanger 4 and further transmitted from the refrigerant to air led by a blower fan 11 for heating the passenger compartment. The heat of the air led by a fan 12 is transmitted to the refrigerant through the outer heat exchanger 7.

On the other hand, during a cooling drive, the four-way valve is set as indicated by a dotted line in FIG. 22 and refrigerant is circulated as follows: The compressor 1→the outer heat exchanger 7→the expansion valve 6→the second inner heat exchanger 5→the first inner heat exchanger 3→the four-way valve 2→the receiver 8→the compressor 1. Accordingly, the heat of the refrigerant discharged from the compressor 1 is radiated into the atmosphere by the first inner heat exchanger 3, the heat of air led by blower fans 9 and 11 is radiated to the refrigerant by the first and second inner heat exchanger 3 and 5, and the cooled air is supplied into the passenger compartment.

With such a conventional air conditioner, the absorbed heat amount by the outer heat exchanger 7 is decreased during the heating drive under a weather condition such that the ambient temperature is low, the automotive vehicle is in running, or it is raining or snowing. Furthermore, if the workload of the compressor 1 is constant, the radiated heat amount from the first and second inner heat exchanger 3 and 5 which radiate the sum of the heat absorbing amount from the outer heat exchanger 7 is decreased, and the heating capacity of the air conditioner is lowered. Additionally, the lowering of the heating capacity invites the frost to the heat exchanger. This increases a defrost drive and prevents a stable heating drive. Furthermore, in order to prevent fogging of windows in the automotive vehicle, both of the cooling and heating drives are often carried out even in the winter season.

However, the heat pump type air conditioner can not simultaneously carry out both cooling and heating, and therefore it is necessary to use other heat source such as exhaust heat from the engine 10 to carry out the above mentioned defogging operation. Accordingly, such a conventional heat pump type air conditioner can not be sufficiently operated if applied to a vehicle having no heat source such as to a solar car or electric vehicle.

SUMMARY OF THE INVENTION

It is an object of the present invention to provide an improved heat pump type air conditioner which improves air-conditioning capacity without changing the direction of refrigerant flow even if cooling and a heat drives are changed.

A heat pump type air conditioner according to the present invention is suitable for an automotive vehicle and comprises refrigerant. A compressor applies a workload to the refrigerant. An outer heat exchanger is connected to a refrigerant discharge side of the compressor and radiates heat from the refrigerant into ambient air. A blower generates an air flow for air-conditioning a passenger compartment of the automotive vehicle. A first inner heat exchanger is connected to the refrigerant discharge side of the compressor and transmits the heat of the refrigerant to the air flow generated by the blower. An expansion valve is connected to a refrigerant outlet side of the first inner heat exchanger. A second inner heat exchanger is connected to a refrigerant outlet side of the expansion valve. The second inner heat exchanger cools the air flow generated by the blower by transmitting heat from the air to the refrigerant which is supplied through the expansion valve from at least one of the outer heat exchanger and the first inner heat exchanger. A switching valve is disposed among the refrigerant discharge side of the compressor, a refrigerant inlet side of the outer heat exchanger and a refrigerant inlet side of the first inner heat exchanger. The switching valve leads the refrigerant to the outer heat exchanger during a heating drive. The switching valve leads the refrigerant to the first inner heat exchanger after leading the refrigerant to the outer heat exchanger during a cooling drive.

With this arrangement, the air-conditioning capacity is improved and the air-conditioning capacity is kept on even when the air conditioner is in the heating drive when necessary to humidify the air flow to the passenger compartment. Furthermore, since it is not necessary to carry out a defrost drive, it becomes possible to continuously drive this air conditioner.

BRIEF DESCRIPTION OF THE DRAWINGS

In the drawings, like reference numerals designate like parts and like elements throughout all figures, in which.

DETAILED DESCRIPTION OF THE INVENTION

Referring to FIGS. 1 to 15, there is shown a first embodiment of a heat pump type air conditioner for an automotive vehicle according to the present invention.

Figure 1:
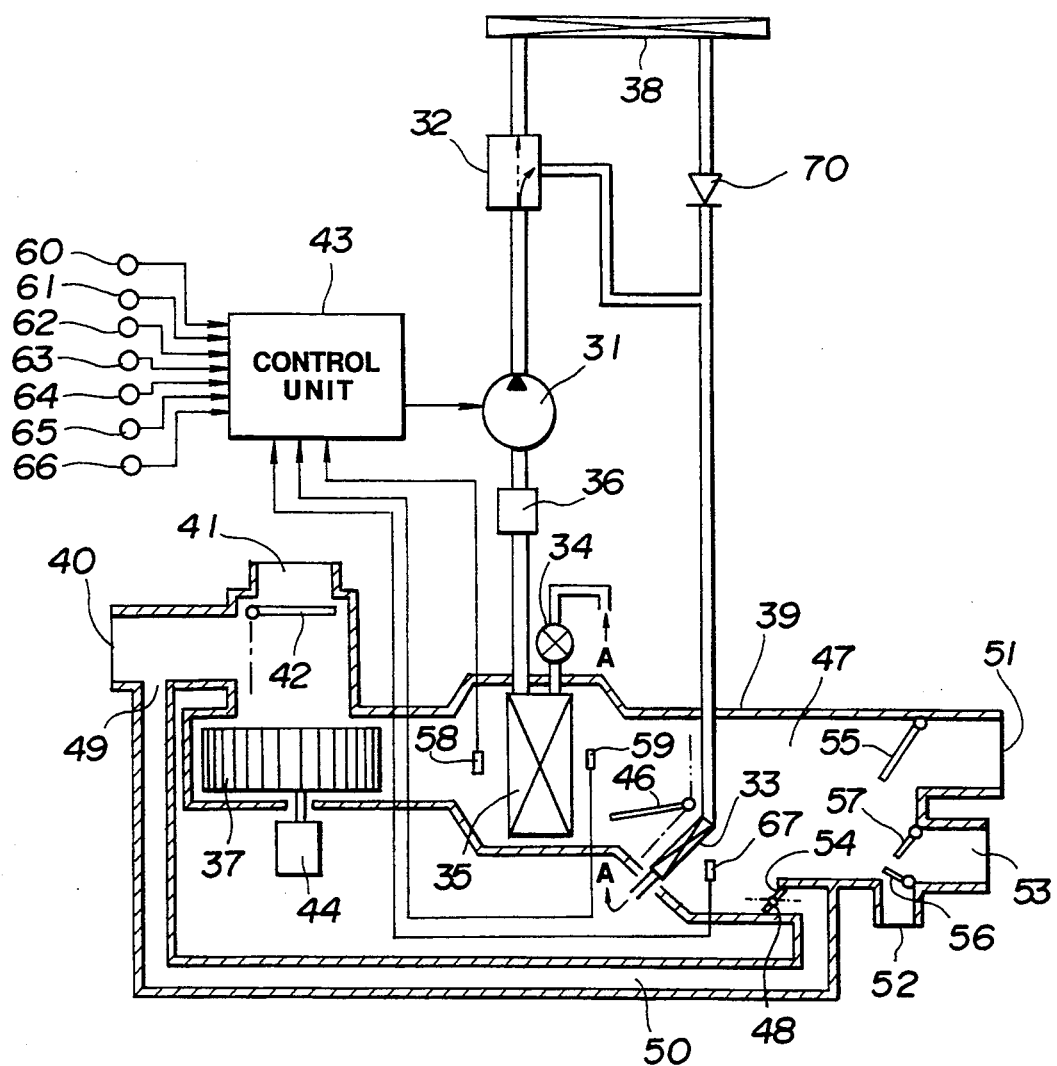
FIG. 1 is a schematic view showing a whole structure of a first embodiment of a heat pump type air conditioner according to the present invention.

As shown in FIG. 1, a compressor 31 is disposed outside of a passenger compartment of the automotive vehicle, such as in an engine room. The compressor 31 is of a type which operates directly on an input power such as an electric drive type or hydraulic drive type. An outer heat exchanger 38 and a first inner heat exchanger 33 are connected to a discharge side of the compressor 31 through a three-way valve 32. The outer heat exchanger 38 is disposed outside of the passenger compartment and serves as an outer condenser for radiating heat of refrigerant discharged from the compressor 31 into the atmosphere. The first inner heat exchanger 33 is disposed in a duct 39 which is located at a front portion of the passenger compartment such as a back side of an instrument panel and serves as a main body of the air conditioner. The first inner heat exchanger 33 serves as an inner condenser of a radiating type which radiates heat of the refrigerant discharged from the compressor 31 to air led by a blower fan 37 functioning as a blowing means.

The three-way valve 32 during a heating drive is set at a state shown by a continuous line in FIG. 1 and also connects to the discharge side of the compressor 31 and a refrigerant inlet of the first inner heat exchanger 33.

On the other hand, the three-way valve during a cooling drive is set at a state shown by a dotted line in FIG. 1 and connects the discharge side of the compressor 31 and the refrigerant inlet of the outer heat exchanger 38.

The refrigerant outlet of the outer heat exchanger 38 is connected to the refrigerant inlet of the first inner heat exchanger 33 through a one-way valve 70. The one-way valve 70 is arranged to allow refrigerant to flow from the outer heat exchanger 38 to the first inner heat exchanger 33 and to prevent the refrigerant from flowing from the first inner heat exchanger 33 to the outer heat exchanger 38. The refrigerant outlet of the first inner heat exchanger 33 is connected to a refrigerant inlet of a second inner heat exchanger 35 through an expansion valve 34 which is disposed outside of the passenger compartment and serves as an expansion means for atomizing a liquid refrigerant by adiabatic expansion. In FIG. 1, reference the mark A→A indicates that the refrigerant conduit is continuously connected between A and A. The second inner heat exchanger 35 is disposed at an upstream side of the first inner. heat exchanger 33 in the duct 39. The second inner heat exchanger 35 serves as an evaporator of an endothermic type by which the heat of the air led by the blower fan 37 is radiated into the refrigerant supplied from at least one of the outer heat exchanger 38 and the first heat exchanger 33 through the expansion valve 34. The refrigerant outlet of the second inner heat exchanger 35 is connected to the inlet of the compressor 31 through a receiver 36 disposed outside of the passenger compartment.

In the duct 39, an inner air inlet 40 for leading the air into the passenger compartment and an outer air inlet 41 for leading outside air due to the wind pressure caused by the driving of the automotive vehicle are disposed upstream of the second inner heat exchanger 35. An intake door 42 for properly mixing the air from the inner air inlet 40 and the outer air inlet 41 is disposed at a dividing portion of the inner and outer air inlets 40 and 41 in duct 39. The blower fan 37 is rotated by a blow fan motor 44 controlled by a control unit 43 and disposed downstream of the inner and outer air inlets 40 and 41 and upstream of the second inner heat exchanger 35 in the duct 39.

An air mixing door 46 is disposed upstream of the first inner heat exchanger 33 in the duct 39. The air mixing door 46 is driven by an actuator (not shown) controlled by the control unit 43 so as to change the ratio of the amounts of cool air and hot air, that is, the ratio between cool air bypassing the first inner heat exchanger 33 and hot air passing through the first inner heat exchanger 33. An opening degree Xdsc of the air mixing door 46 is defined as follows: When the air mixing door 46 is located at a position indicated by a dashed line in FIG. 1 and the rate of the cool air is 100%, the opening degree Xdsc is defined as 0% (full close condition). When the air mixing door 46 is located at a position indicated by a two-dot chain line in FIG. 1 and the rate of the hot air is 100%, the opening degree Xdsc is defined as 100% (full open condition).

In order to further improve the mixing of cool air and hot air, an air mixing chamber 47 is disposed downstream of the first inner heat exchanger 33 in the duct 39. An conditioned air inlet 48 is disposed near the air outlet of the first inner heat exchanger 33 in the air mixing chamber 47 in order to recirculate the conditioned air to the inner air inlet 40. A recirculating duct 50 is arranged to communicate the conditioned air inlet 48 with the outside air inlet 40. The air mixing chamber 47 has an ventilator outlet 51 for blowing the conditioned air toward an upper side of a vehicle passenger (though not shown), a foot outlet 52 for blowing the conditioned air toward a foot portion of the vehicle passenger and a defroster outlet 53 for blowing the conditioned air toward a front glass (not shown). A return door 54, a ventilator door 55, a foot door 56 and a defroster door 57 are disposed in the air mixing chamber 47. The return door 54 is arranged to open and close the conditioned air inlet 48 owing to a return door actuator (not shown) controlled by the control unit 43. The ventilator door 55 is arranged to open and close the ventilator outlet 51 owing to a ventilator door actuator (not shown) controlled by the control unit 43. The foot door 56 is arranged to open and close the foot outlet 52 owing to the foot door actuator (not shown) controlled by the control unit 43. The defroster door 57 is arranged to open and close the defroster outlet 53 owing to a defroster door actuator (not shown) controlled by the control unit 43.

The control unit 43 is connected to thermal information input means such as an inlet air temperature sensor 58 of the second inner heat exchanger 35, an outlet air temperature sensor 59 of the second inner heat exchanger 35, a blowout air temperature sensor 60 of the ventilator outlet 51, a solar radiation sensor 61, an outer air (ambient) temperature sensor 62, a room air temperature sensor 63, an inner temperature setting device 64, a blowout outlet mode switch 65, a blower fan switch 66 and an outlet air temperature sensor 67 of the first inner heat exchanger 33.

The inlet air temperature sensor 58 detects an inlet air temperature Tsuc and sends it to the control unit 43. The outlet air temperature sensor 59 detects a blowout air temperature Tout and sends it to the control unit 43. The blowout air temperature sensor 60 detects a ventilator blowout air temperature Tvent and sends it to the control unit 43. The solar radiation sensor 61 detects a solar radiation amount Qsun to the vehicle and sends it to the control unit 43. The outer air temperature sensor 62 detects an outer air temperature Tamb and sends it to the control unit 43. The room air temperature sensor 63 detects a room air temperature Troom and sends it to the control unit 43. A preset room temperature Tptc through the room temperature setting device 64 is sent to the control unit 43. The outlet air temperature sensor 67 detects a blowout air temperature Tv and sends it to the control unit 43. The control unit 43 calculates target air-conditioning factors such as the air mixing door opening degree Xdsc, an anticipated input value W of the compressor 31, a real input value Wcomp of the compressor 31, an air flow rate Veva passing through the second inner heat exchanger 35 and a target conditioned air temperature Tof, according to the above-mentioned thermal information. Furthermore, on the basis of the calculated values, the control unit 43 drives the compressor 31, the blower fan motor 44, the air-mixing door actuator, the return door actuator, the ventilator door actuator, the foot door actuator and the defroster door actuator so as to keep the target air-condition factors to the calculated value.

Figure 2:
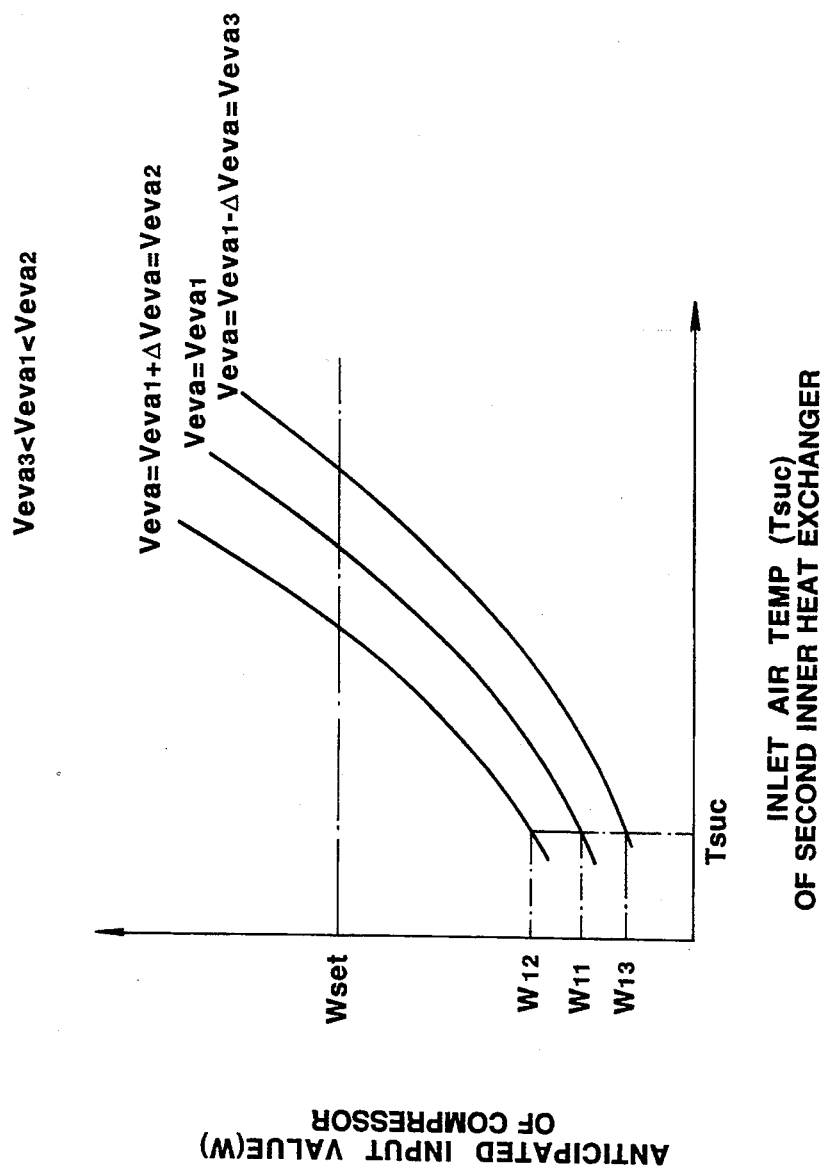
FIG. 2 is an anticipated input value map applied to the first embodiment of FIG. 1.

FIG. 2 shows an anticipated input value map which is memorized in the control unit 43 and is used in order to obtain the anticipated input value W of the compressor 31 according to the inlet air temperature Tsuc and the air flow rate Veva. In this anticipated input value map, a horizontal line indicates a inlet air temperature Tsuc, and a vertical line indicates an air flow rate Veva. A curve indicates an air flow rate Veva determined on the basis of the rotation number of the blower fan motor 44 and is drawn in the first quadrant of a plane coordinate. The anticipated input value W is obtained from the inlet air temperature Tsus by every change of the air flow rate Veva. For example, when the inlet air temperature Tsuc is $Tsuc_1$ (Tsuc= $Tsuc_1$) and the air flow rate Veva is $Veva_1$ (Veva=$Veva_1$), the anticipated input value W is obtained as $W_{11}$ (W=$W_{11}$). Furthermore, when the air flow rate Veva is increased from $Veva_1$ by $\Delta Veva$ (Veva=$Veva_1 + \Delta Veva$) while the inlet air temperature Tsuc is $Tsuc_1$ (Tsuc=$Tsuc_1$), the anticipated input value W is increased to $W_{12}$ ($W_{11} < W_{12}$). On the other hand, when the air flow rate Veva is decreased from $Veva_1$ by $\Delta Veva$ (Veva=$Veva_1 - \Delta Veva$) while the inlet air temperature Tsuc is $Tsuc_1$ (Tsuc=$Tsuc_1$), the anticipated input value W is decreased to $W_{13}$ ($W_{13} < W_{11}$). The anticipated input value W of the compressor 31 corresponds to the anticipated workload of the compressor 31 which is necessary to cool the air of the air flow rate Veva blown by the blower fan 37 to a temperature at which the air is able to be prevented from being frozen.

FIGS. 3 to 8 show flow charts carried out by the control unit during the air-conditioning. These flow charts are started in reply with the turn-on of the control unit 43 which is turned on with the turn-on of the main switch (not shown) of the automotive vehicle.

Figure 3:
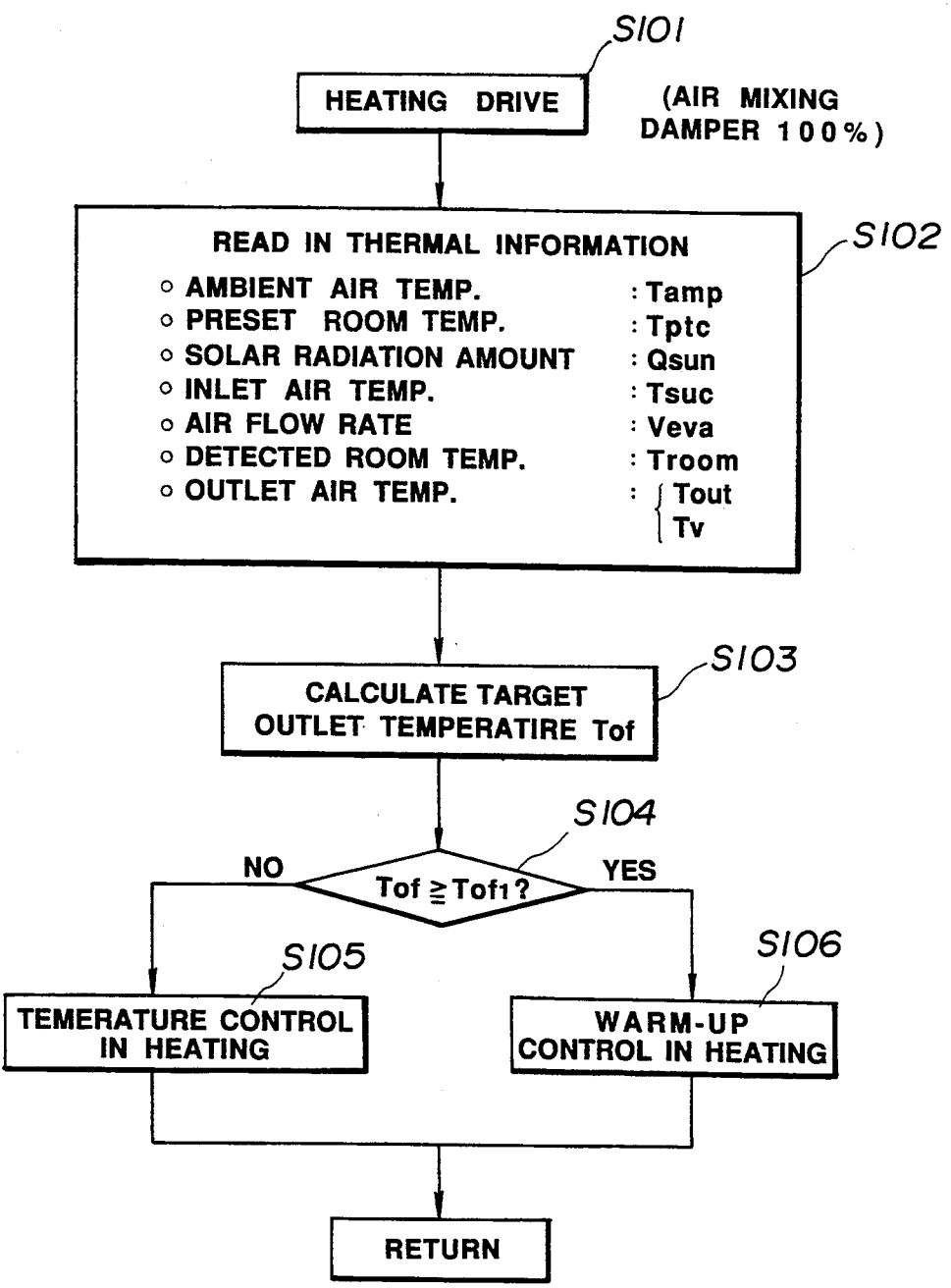
FIG. 3 is a flow chart for a heating drive of the first embodiment.

FIG. 3 shows a flow chart of the heating operation. When the heating operation is started corresponding a step S101 in FIG. 3, the opening degree of the air-mixing door is set to 100%.

In a step S102, the control unit reads in the ambient air temperature Tamb, the preset room air temperature Tptc, the solar radiation amount Qsun, the inlet air temperature Tsuc, the air flow rate Veva, the room air temperature Troom, the outlet air temperature Tout and the outlet air temperature Tv.

In a step S103, the target outlet air temperature Tof is calculated on the basis of the thermal information read in at the step S102.

In a step S104, it is judged whether or not the target outlet temperature Tof is greater than or equals to the preset value $Tof_1$. When the judgment in the step S104 is "YES" (Tof$\geq Tof_1$), the control unit judges that it is necessary to rapidly heat the vehicle compartment and the program proceeds to a step S106 wherein a heating warming-up control is carried out. On the other hand, when the judgment in the step S104 is "NO" (Tof<$Tof_1$), it is judged that the room temperature approaches the preset temperature and the program proceeds to a step S105 wherein a heating temperature control is carried out.

Figure 4:
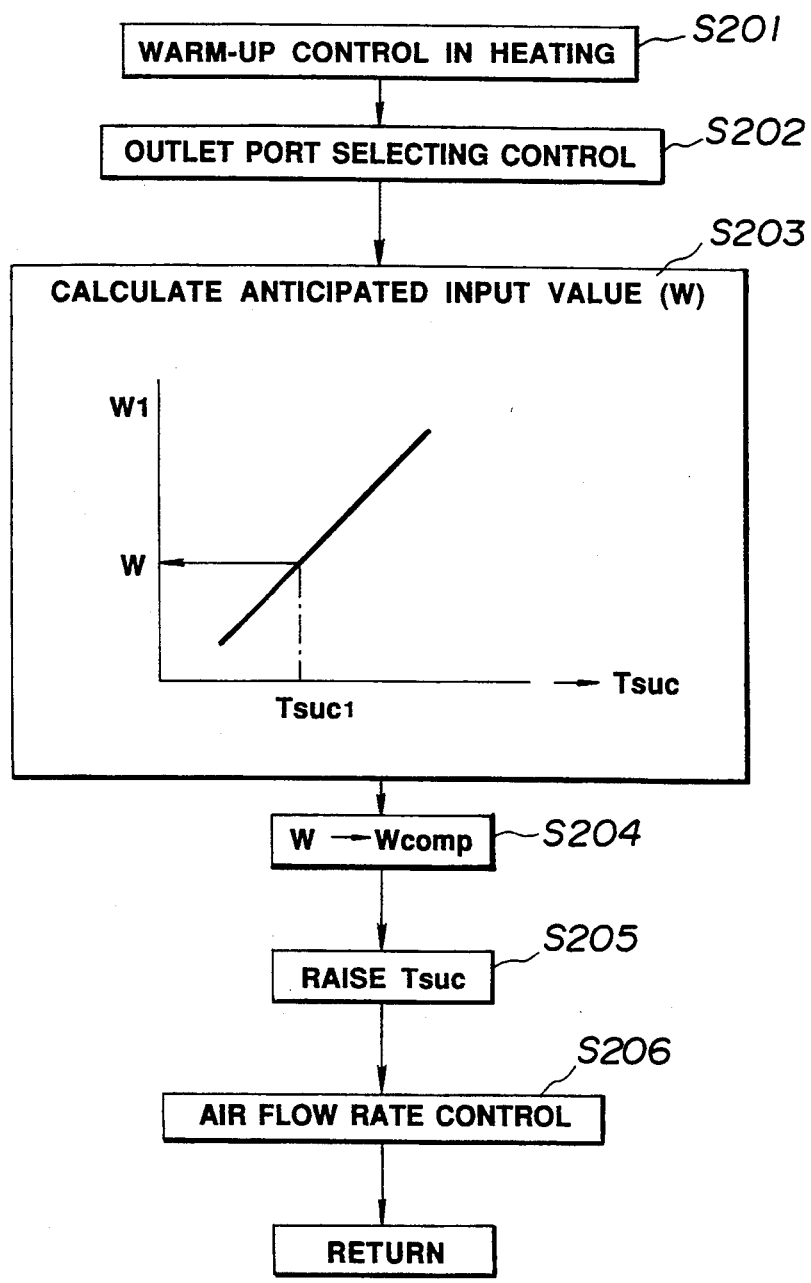
FIG. 4 is a flow chart for a warm-up control during a heating drive.

FIG. 4 shows a flow chart of the warming-up control in the heating drive. In a step S201, the operation of the warming-up control is started and the program proceeds to a step S202 wherein it is decided which blowout outlet port is used. The blowout outlet is selected in a manual operation by a vehicle passenger or changed according to the target outlet air temperature Tof such that the vehicle passenger feels amenity.

In a step S203, the inlet air temperature Tsuc and the air flow rate Veva are referenced with the anticipated input value map in the control unit 43, and the anticipated input value W of the compressor 31 corresponding to the inlet air temperature Tsuc and the air flow rate Veva is obtained from the map.

In a step S 204, the anticipated input value W is treated as a real input value Wcomp and a control signal corresponding the real input value Wcomp is outputted to the compressor 31.

In a step S205, in order to rapidly heat the passenger compartment by increasing the anticipated input value W obtained in a step 203, a control for raising the inlet air temperature Tsuc is carried out. In concrete, the amount of the introduced low temperature outer air is decreased by controlling the opening degree of the intake door 42, or part of the outlet air heated by the recirculated duct 50 is led to the second inner heat exchanger 35.

In a step S206, the air flow rate control is carried out. That is to say, the air flow rate is changed according to the outlet air temperature Tv and the target outlet temperature Tof so as not to avoid the amenity of the passenger.

Figure 5:
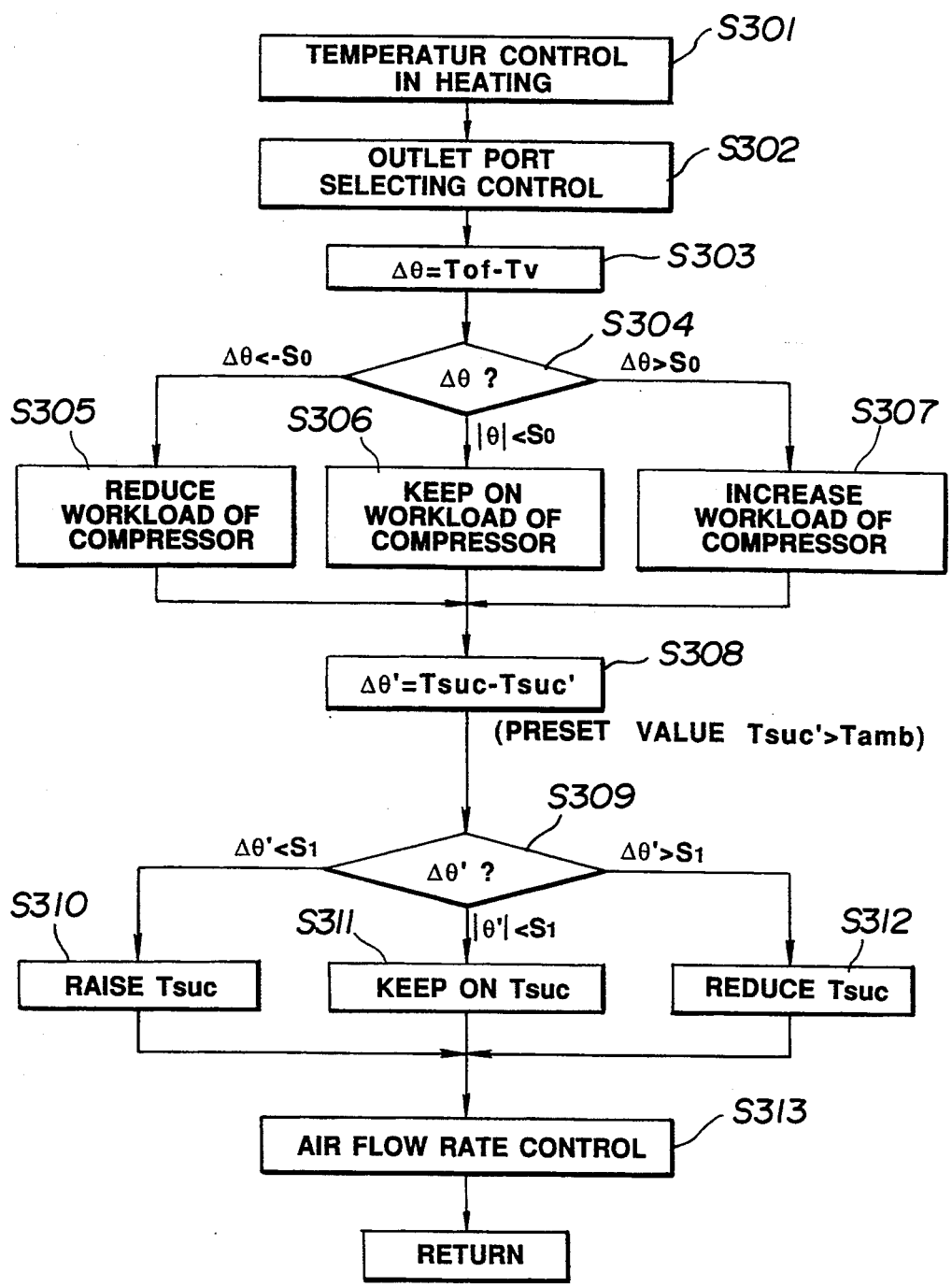
FIG. 5 is a flow chart for a temperature control during the heating drive.

FIG. 5 shows a flow chart of a temperature control in the heating drive. In a step S301, the operation of the temperature control is started and the program proceeds to a step S302 wherein it is decided which blowout outlet is used. The blowout outlet is selected in a manual operation by a vehicle passenger or changed according to the target outlet air temperature Tof such that the vehicle passenger feels amenity.

In a step S303, a deviation $\Delta\theta$ between the target outlet temperature Tof and the outlet air temperature Tv is calculated.

In a step S304, the size of the deviation $\Delta\theta$ is compared with a predetermined standard value S. When $\Delta\theta < -S_0$, it is judged that the outlet air temperature Tv is higher than a target outlet air temperature Tof, and the program proceeds to a step S305 wherein the workload of the compressor 31 is reduced so as to lower the outlet air temperature Tv. On the other hand, When $\Delta\theta > S_0$, it is judged that the outlet air temperature Tv is lower than a target outlet air temperature Tof, and the program proceeds to a step S307 wherein the workload of the compressor 31 is increased so as to raise the outlet air temperature Tv. Furthermore, When $S_0 \geq \Delta\theta \geq -S_0$, it is judged that the outlet air temperature Tv is kept within a proper range and the program proceeds to a step S306 wherein the workload of the compressor 31 is kept on.

In a step S308, the deviation $\Delta\theta'$ between the inlet air temperature Tsuc and a preset value Tsuc' which is higher than the inlet air temperature Tsuc is calculated.

In a step S309, the size of the deviation $\Delta\theta'$ is compared with a predetermined value S1. When $\Delta\theta' < -S_1$, it is judged that the inlet air temperature Tsuc is lower than the preset value Tsuc', and the program proceeds to a step S310 wherein a control for raising the inlet air temperature Tsuc such as a reduction of the leading amount of the outside air and/or the increase of the air flow rate from the recirculating duct 50, is carried out. When $\Delta\theta' > S_1$, it is judged that the inlet air temperature Tsuc is higher than the preset value Tsuc', and the program proceeds to a step S312 wherein a control for lowering the inlet air temperature Tsuc such as a increase of the leading amount of the outside air and/or the reduction of the air flow rate from the recirculating duct 50, is carried out. Furthermore, When $S1 \geq \Delta\theta' \geq -S_1$, it is judged that the inlet air temperature Tsuc is kept within a proper range and. the program proceeds to a step S311 wherein the inlet air temperature Tcus is kept on.

In a step S313, an air flow rate control is carried out. The air flow rate control is an operation for changing an air flow rate according to the outlet air temperature Tv and the target outlet air temperature Tof while keeping the amenity of the vehicle passenger.

Figure 6:
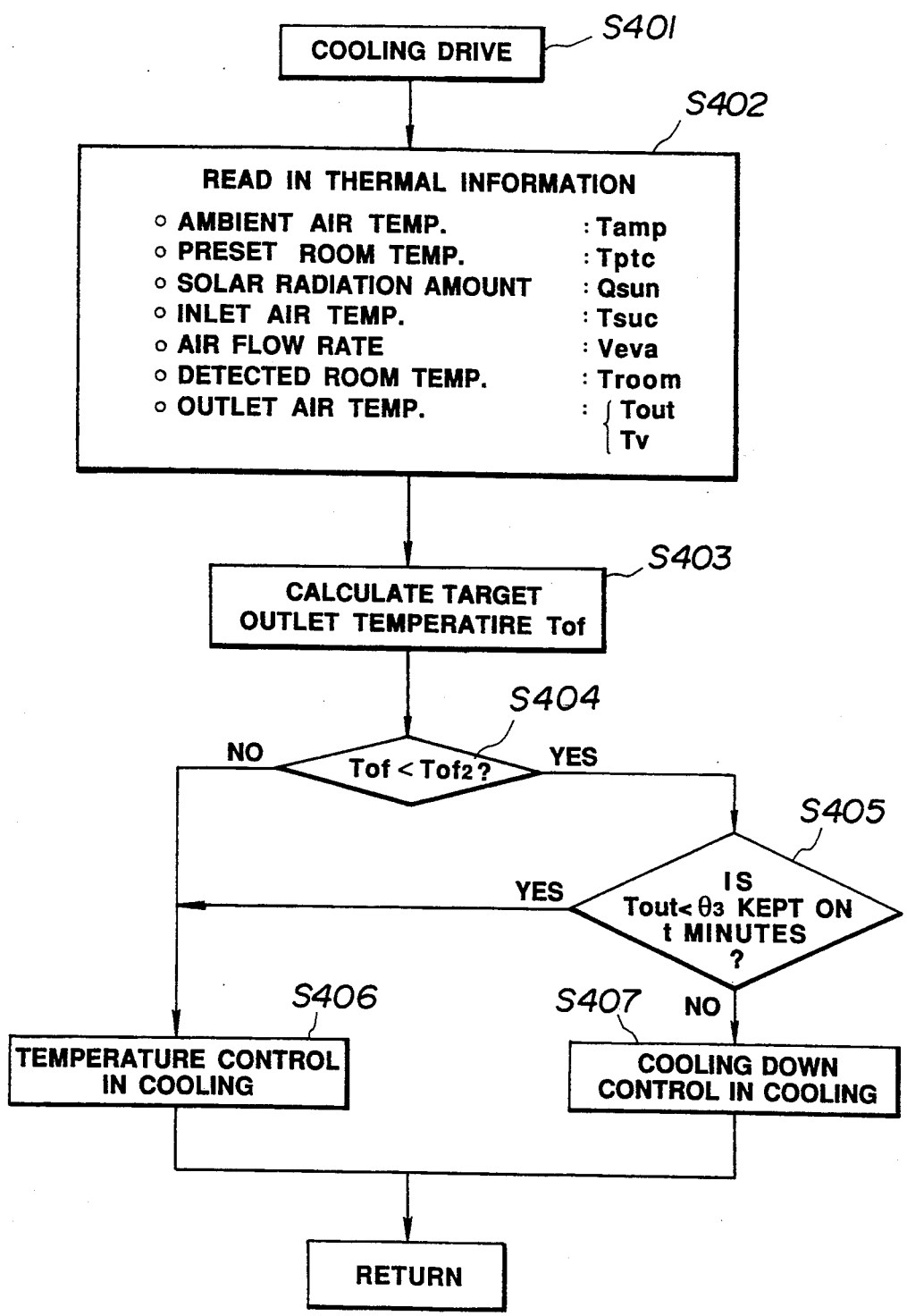
FIG. 6 is a flow chart during a cooling drive.

FIG. 6 shows a flow chart of the cooling drive. In a step S401, the operation of the cooling drive is started. In a step S402, the control unit 43 reads on the ambient air temperature Tamb detected by the ambient air temperature sensor 62, the preset room temperature Tptc, the solar radiation amount Qsun, the inlet air temperature Tsuc of the second inner heat exchanger 35, the air flow rate Veva passing through the second inner heat exchanger 35, outlet air temperature Tout of the second inner heat exchanger 35 and the outlet air temperature Tv of the first inner heat exchanger 33.

In a step S403, a target outlet air temperature Tof is calculated on the basis of the thermal information read in at the step S402.

In a step S404, it is judged whether or not the target outlet air temperature Tof is smaller than the preset value Tof$_2$. When the judgment in the step is "YES" (Tof<Tof$_2$), the program proceeds to a step S405. When the judgment in the step S404 is "NO" (Tof$\geq$Tof$_2$), the program proceeds to a step S406 wherein a cooling thermal control is carried out.

In the step S405, it is judged whether or not t minutes have been passed under a condition that the outlet air temperature Tout of the second inner heat exchanger 35 is lower than $\theta 3$. When the judgment in the step S405 is "YES", the cooling down operation in the step S407 is stopped and the program proceeds to a step S406 wherein a normal cooling by temperature control is carried out, in order to avoid a freezing of the second inner heat exchanger 35.

Figure 7:
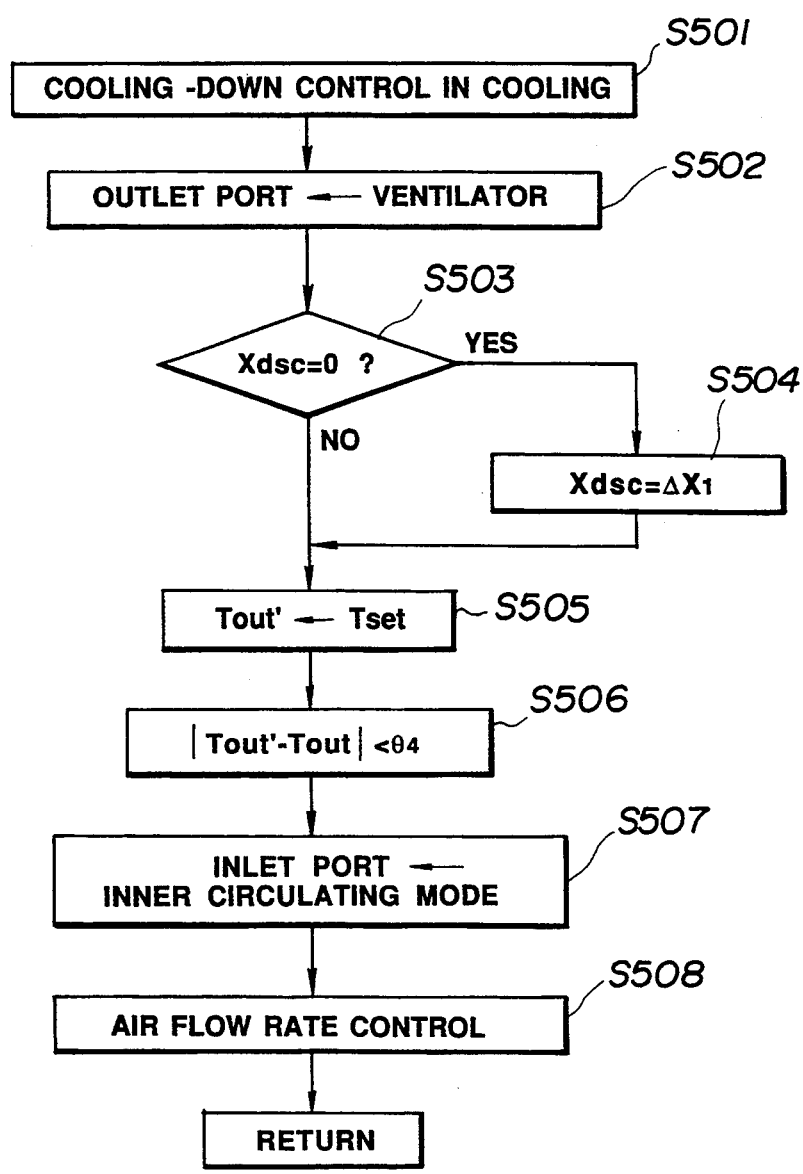
FIG. 7 is a flow chart for a cooling down control during the cooling drive.

FIG. 7 shows a flow chart of the cooling by cooling down control. The cooling down control is started in a step S501. In a step S502, the vent outlet 51 is selected as an outlet although the manual selection by the vehicle passenger is prior to this cooling down control.

In a step S503, it is judged whether or not the opening degree Xdsc of the air mixing door is 0%. When Xdsc=0, the program proceeds to a step S504.

In a step S504, the opening degree Xdsc is set at $\Delta X1$ (Xdsc=$\Delta X1$) to slightly open the mixing door 46 in order to lead part of air passed through the second inner heat exchanger 35 into the first inner heat exchanger 33. With this operation, the refrigerant supplied from the first inner heat exchanger 33 to the expansion valve 34 is securely liquidated and stably supplied. Accordingly, the refrigerating cycle is stably driven so that the cooling down performance in the cooling drive is improved while the trouble such as the seizing of the compressor 31 is decreased.

In a step S505, the preset temperature Tout is treated as a target value Tout' of the outlet air temperature Tout of the second inner heat exchanger 35.

In a step S507, the selection of the inlet port is set to an inner circulating mode such that the outside air inlet port 41 is fully closed by the intake door 42 and the inner inlet port 40 is fully opened.

In a step S508, the air flow rate control is carried out.

Figure 8:
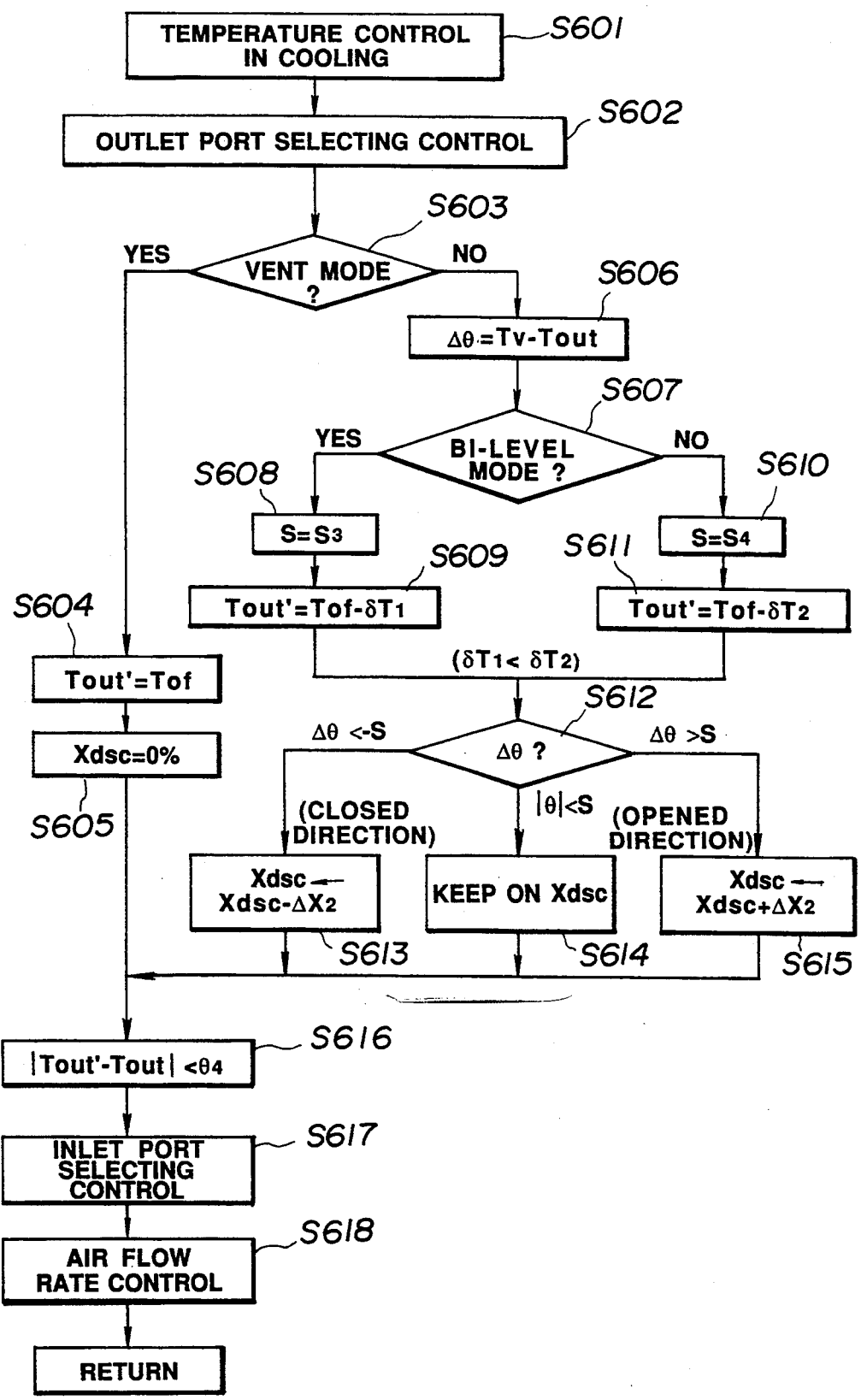
FIG. 8 is a flow char for a temperature control in the cooling drive.

FIG. 8 shows a flowchart of the temperature control in cooling. The temperature control in the cooling drive is started in the step S601. In a step S602, the outlet port through which the outlet air is blown out is selected. The selection of the outlet port is carried out by being manually selected by the vehicle passenger through the manual switch or by automatically selected by this control system according to the target outlet air temperature Tof such that the vehicle passenger feels amenity.

In a step S603, it is judged whether the outlet port is set to the vent mode or not. When the outlet is set to the vent mode, the program proceeds to a step S604. When the outlet port is set to the other mode except for the vent mode, the program proceeds to a step S606.

In the step S604, the target outlet air temperature Tof is treated as a target value Tout' of the outlet air temperature Tout.

In a step S605, the opening degree Xdsc is set to 0% (Xdsc=0), that is, the air mixing door 46 is set to fully close the air inlet of the first inner heat exchanger 33.

In the step S606, the deviation $\Delta\theta$ between the outlet air temperature Tv from the first inner heat exchanger 33 and the outlet air temperature Tout of the second inner heat exchanger 35 is calculated.

In a step S607, it is judged whether the system is set to a high level mode or not. When the judgment in the step 608 is "YES", the program proceeds to a step S608 wherein the standard value S, by which the opening condition of the air mixing door 46 is judged, is set as S3 ($S=S_2$). Following this, in a step S609 the target value Tout' relative to the outlet air temperature Tout is set to $Tof-\delta T_1$ ($Tout'=Tof-\delta T_1$). When the judgment in the step S607 is "NO", that is, when the system is set to the defrost mode, the program proceeds to a step S610 wherein the standard value S is set to S4. Following this, in a step S611 the target value Tout' relative to the outlet air temperature Tout is set to $To-\delta T_2$ ($Tout'=Tof-\delta T_2$).

In a step S612, the size of the deviation $\Delta\theta$ calculated in the step S606 is judged according the standard value S. When $\Delta\theta<-S$, the program proceeds to a step S613 wherein the air mixing door 46 is slightly closed by $\Delta X_2$ in order to decrease the partial deviation of the air temperature by reducing the reheated air amount. When $\Delta\theta>S$, the program proceeds to a step S615 wherein the air mixing door 46 is slightly opened by $\Delta X_2$ in order to increase the partial deviation of the air temperature by increasing the reheated air amount. When $-S<\Delta\theta<S$, the opening degree Xdsc is kept on.

In a step S616, the workload of the compressor 31 is controller so that the outlet air temperature Tout of the second inner heat exchanger 35 is adjusted to the target value Tout' set in the steps S604, S609 or S611.

In a step S617, the air suctioning operation is carried out. For example, if the first embodiment of this system is applied to an electric vehicle, a smaller electric energy consumption is achieved by selecting a smaller loading air for the system.

In a step S618, the air flow rate is controlled.

With the thus arranged first embodiment of the system according to the present invention, during a heating drive the three-way valve 32 is switched as indicated by a continuous line in FIG. 1, and the refrigerant is circulated as follows: The compressor 31→the three-way valve 32→the first inner heat exchanger 33→the expansion valve 34→the second inner heat exchanger 35→the receiver 36→the compressor 31. Accordingly, the air led by the blower fan 37 is heated by the refrigerant passing through the first inner heat exchanger 33. Air led by the fan flow 37 is cooled by the refrigerant passing through the second inner heat exchanger 35.

On the other hand, during a cooling drive the three-way valve 32 is switched as indicated by a dotted line in FIG. 1, and the refrigerant in the system is circulated as follows: The compressor 31→the three-way valve 3→the outer heat exchanger 38→the first inner heat exchanger 33→the expansion valve 34→the second inner heat exchanger 35→the receiver 36→the compressor 31. Accordingly, the outer heat exchanger transmits the heat of the refrigerant discharged from the compressor 31 to the ambient air. Furthermore, the remaining heat of the refrigerant is transmitted to the air led by the blower fan 37 through the first inner heat exchanger 33. The second inner heat exchanger 35 transmits the heat of the air led by the fan blower 37 or led by the ram pressure during the vehicle running to the refrigerant. Therefore the air passing through the first inner heat exchanger 33 is heated and the air passing through the second heat exchanger 35 is cooled.

That is to say, during the heating drive, the amount of the absorbing heat of the second inner heat exchanger 35 and the workload corresponding to the real input value Wcomp of the compressor 31 are radiated from the first inner heat exchanger 33 due to the starting of the compressor 31. Accordingly, air whose temperature is higher than the inlet air temperature Tsuc of the second inner heat exchanger 35 is blown to the passenger compartment. That is to say, the inlet air temperature Tsuc is raised in keeping with the lapse of a driving time, and the real input value Wcomp of the compressor 31 is increased. Accordingly, the passenger compartment is heated rapidly. Furthermore, since the air passed through the second inner heat exchanger 35 is led to the first inner heat exchanger 33, the efficiency of the compressor 31 is justified into optimum in a manner to determine the real input value Wcomp so as not to generate the frozen in the second inner heat exchanger 35 relative to the heat load of the. air passing through the second inner heat exchanger 35. Additionally, since the air supplied to the passenger compartment is dehumidified in the second inner heat exchanger 35 and heated in the first inner heat exchanger 33, it becomes possible that the heating with dehumidification is continuously carried out without degrading the heating capacity and carrying out the defrost drive.

Furthermore, the heating performance relies upon the thermal load of the inlet air of the second inner heat exchanger 33. Accordingly, when the ambient air temperature is extremely low or the passenger compartment should be rapidly warmed, the freezing in the second inner heat exchanger 35 is prevented even if the real input value Wcomp of the compressor 31 is increased by opening the return door 54 to circulate part of the heated air passed through the first inner heat exchanger 33 from the recirculating duct 50 to the inner air guide port 40 or by heating the air flowing into the second inner heat exchanger 35 by means of a heater (not shown) or a discharged heat of an engine (not shown). Additionally, since the increased amount of the real input value Wcomp is transformed to the radiated heat amount from the first inner heat exchanger 33, the outlet air temperature is further increased.

When the first embodiment of the air conditioner according to the present invention is in a condition that a cooling down control in the cooling drive is carried out and a mode except for a defrost mode or bi-level mode is selected, and the opening degree Xdsc of the air mixing door 46 equals to 0 (Xdsc=0), the opening degree Xdsc of the air mixing door 46 is set to $\Delta X_1$. With this slight opening of the air mixing door 46, a part of the cool air passed through the second inner heat exchanger 35 is led to the first inner heat exchanger 33. Accordingly, the amount of the liquidated refrigerant flowed from the first inner heat exchanger 33 to the expansion valve 34 is increased, the refrigerant stably supplied to the second inner heat exchanger 35. This enables the refrigerant cycle to operate stably, the trouble such as the seizing of the compressor 31 to be decreased and the cooling-down performance to be improved.

Herein, a result of an experiment which is carried out in a heating drive of the first embodiment according to the present invention. The experiment is carried out under the following condition: Ambient air temperature 0° C., room temperature 5° C., the air flow rate passing through the second inner heat exchanger 35 4 m³/min. (fixed), no passenger is in the passenger compartment, no solar radiation, the second inner heat exchanger 35 is for a five-seater passenger car equipped with 2000 cc engine, the compressor 31 is of a variable delivery compressor.

Figure 9:
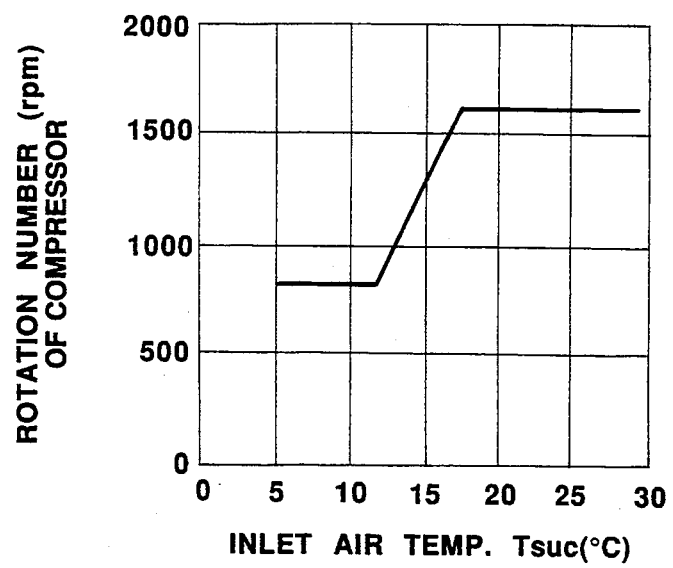
FIG. 9 is a graph showing a relationship between the inlet air temperature and the rotation number of the compressor under the heating drive.

Furthermore, the real input value Wcomp of the compressor 31 relative to the inlet air temperature Tsuc of the second inner heat exchanger 35 is changed such that the outlet air temperature Tout of the second inner heat exchanger 35 is kept at about 0° C. by changing the rotation number of the compressor 31, as shown in FIG. 9. That is to say, when the inlet air temperature Tsuc of the second inner heat exchanger 35 is ranging from 5° C. to 11° C. (5° C.$\leq$Tsuc$<$11° C.), the rotation number of the compressor 31 is set at 800 rpm. When the inlet air temperature Tsuc is ranging from 11° C. to 17° C. (11° C.$\leq$Tsuc$<$17° C.), the rotation number of the compressor 31 is changed from 800 rpm to 1600 rpm according to the raising of the inlet air temperature Tsuc. When Tsuc$\geq$17° C., the rotation number of the compressor 31 is fixed to 1600 rpm.

Figure 10:
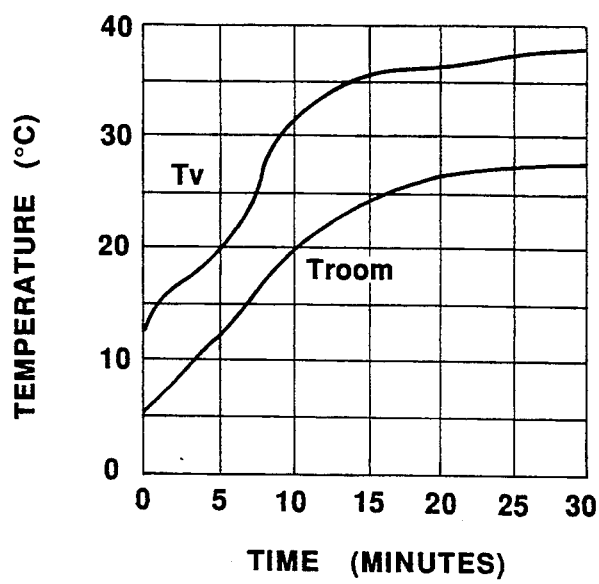
FIG. 10 is a graph showing a result of the experiment by a five-seater passenger car equipped with 1500 cc engine under the heating drive.
Figure 11:
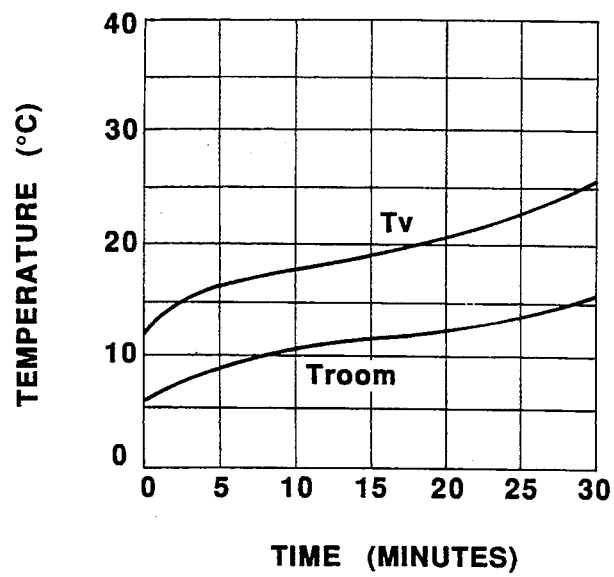
FIG. 11 is a graph showing a result of the experiment by a five-seater passenger car equipped with 2000 cc engine under the heating drive.

In case that the warm up drive of the air conditioner is started under the above mentioned condition, the outlet air temperature Tv and the detected air temperature Troom of a five-seater car equipped with 1500 cc engine were raised as shown in FIG. 10. Those of a five-seater passenger car equipped with 2000 cc engine were raised as shown in FIG. 11. Since the heat loss toward the outside of the 2000 cc engine five-seater car is larger than that of the 1500 cc engine five-seater car, the outlet air temperature TV and the detected room temperature Troom of the 2000 cc engine car are slowly raised as compared with those of the 1500 cc engine car in the event that the all air passed through the first inner heat exchanger 33 is blown out into the passenger compartment.

Figure 12:
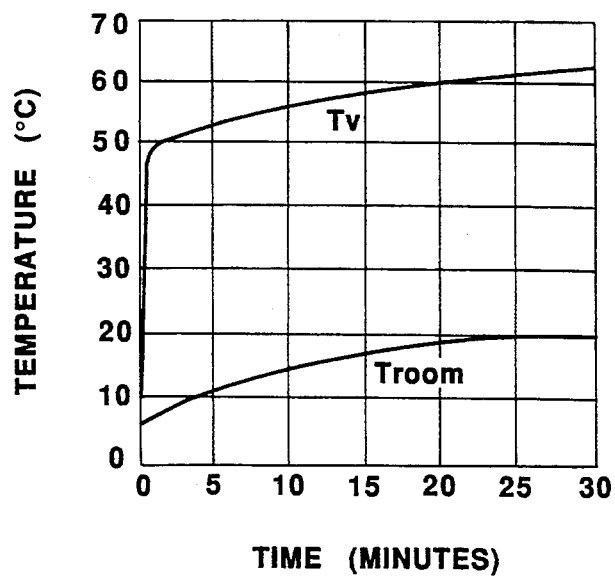
FIG. 12 is a graph showing a result of the experiment by the five-seater passenger car equipped with 2000 cc engine under a rapid heating.

In order to improve the raising characteristics of the temperatures Tv and Troom, a part of the passed through the first inner heat exchanger 33 was recirculated to the inner air inlet port 49 by using the recirculating duct 50. With this operation, the result shown in FIG. 12 was obtained. FIG. 12 was obtained under a condition that the air flow amount of 3 m³/min. relative to the air flow amount of 4 m³/min. is recirculated. By raising the inlet air temperature Tsuc of the second inner heat exchanger 35, the freezing of the second inner heat exchanger 35 becomes not to occur, and the real input value Wcomp of the compressor 31 is increased. Consequently, highly warmed outlet air temperature Tv is obtained.

With the experiment of the warming drive, since the real input value Wcomp of the compressor 31 is varied according to the inlet air temperature Tsuc of the second inner heat exchanger 35, even if the ambient temperature is relatively low, the room temperature is rapidly raised and the continuous drive of the air conditioner becomes possible by carrying out the control for increasing the heat load of air flowing into the second inner heat exchanger 35. Furthermore, in a manner that the first inner heat exchanger 33 is cooled by the air cooled by the second inner heat exchanger 35 and the inner circulating mode is mainly carried out, the warming performance is kept on even if the first inner heat exchanger 33 becomes smaller.

Next, the result of the experiment of the cooling drive will be shown. The condition of this experiment is as follows: the compressor 31 is of a variable delivery type and arranged such that the outlet air temperature Tout from the second inner heat exchanger 35 is kept at about 4° C. Accordingly, the real input value Wcomp of the compressor 31 is changed according to the heat load of the second inner heat exchanger 35. The rotation number of the compressor 31 is fixed to 1100 rpm. the ambient temperature Tamb is 36° C. the air flow amount Veva passing through the second inner heat exchanger 35 was 5m³/min. under 25° C.(40%).

Figure 13:
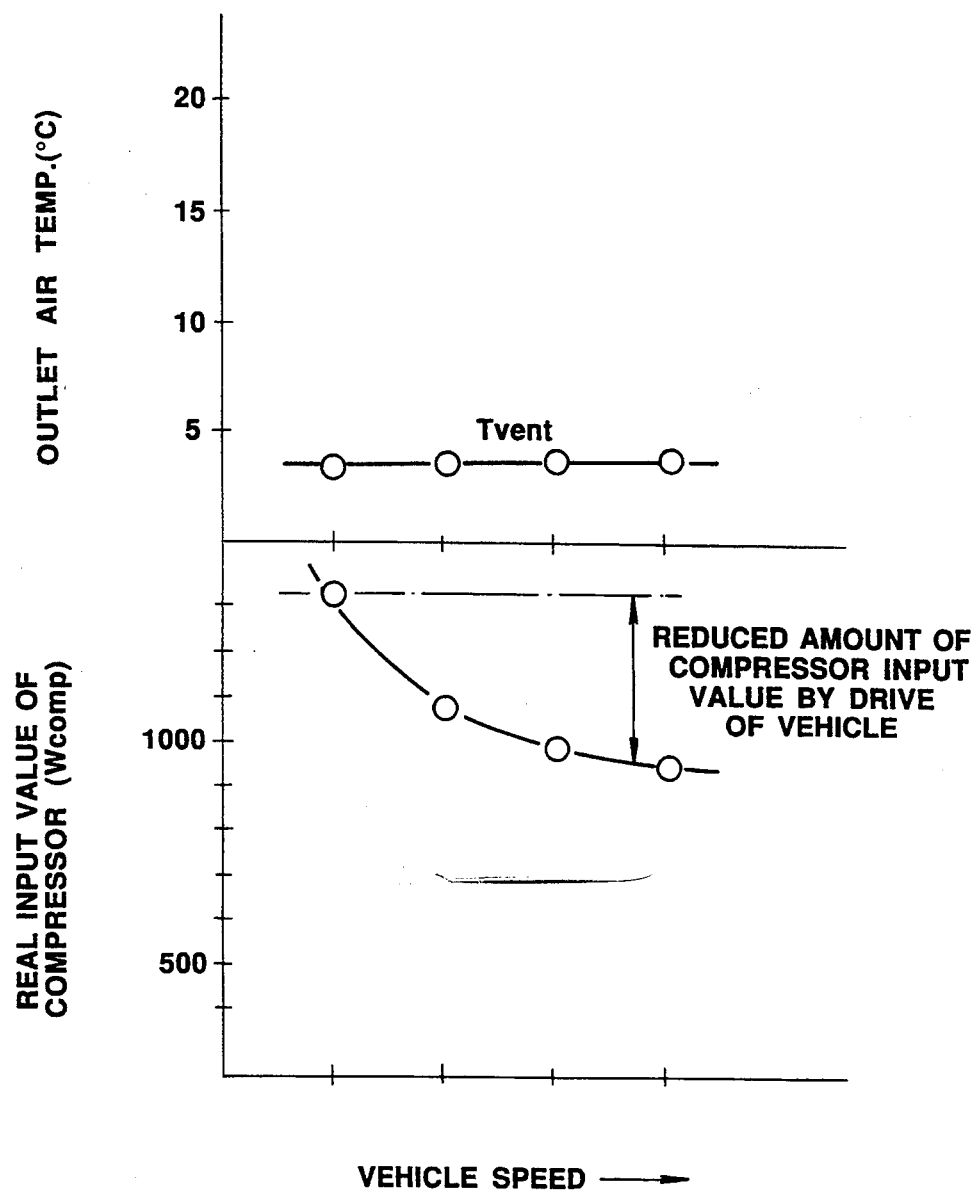
FIG. 13 is a result of the experiment under a vent mode of the cooling drive.

FIG. 13 shows a result of the experiment under a vent mode. A vertical line represents the outlet air temperature Tvent from the ventilator outlet port 51 and the real input value Wcomp of the compressor 31. A horizontal line represents the vehicle speed. In the vent mode, the opening degree Xdsc of the air mixing door is set to 0% (Xdsc=0%), and the target conditioned air temperature Tof is set to 4° C. Accordingly, the target outlet air temperature Tof becomes equal to the target value Tout' of the outlet target air temperature Tout (Tout'=Tof=4° C.). As shown in FIG. 13, the air conditioner according to the present invention performs superior outlet air temperature keeping performance in the vent mode, the outlet air temperature Tout of the compressor 31 is kept at 4° C. although the real input value Wcomp of the compressor 31 becomes small according to the increase of the vehicle speed.

Figure 14:
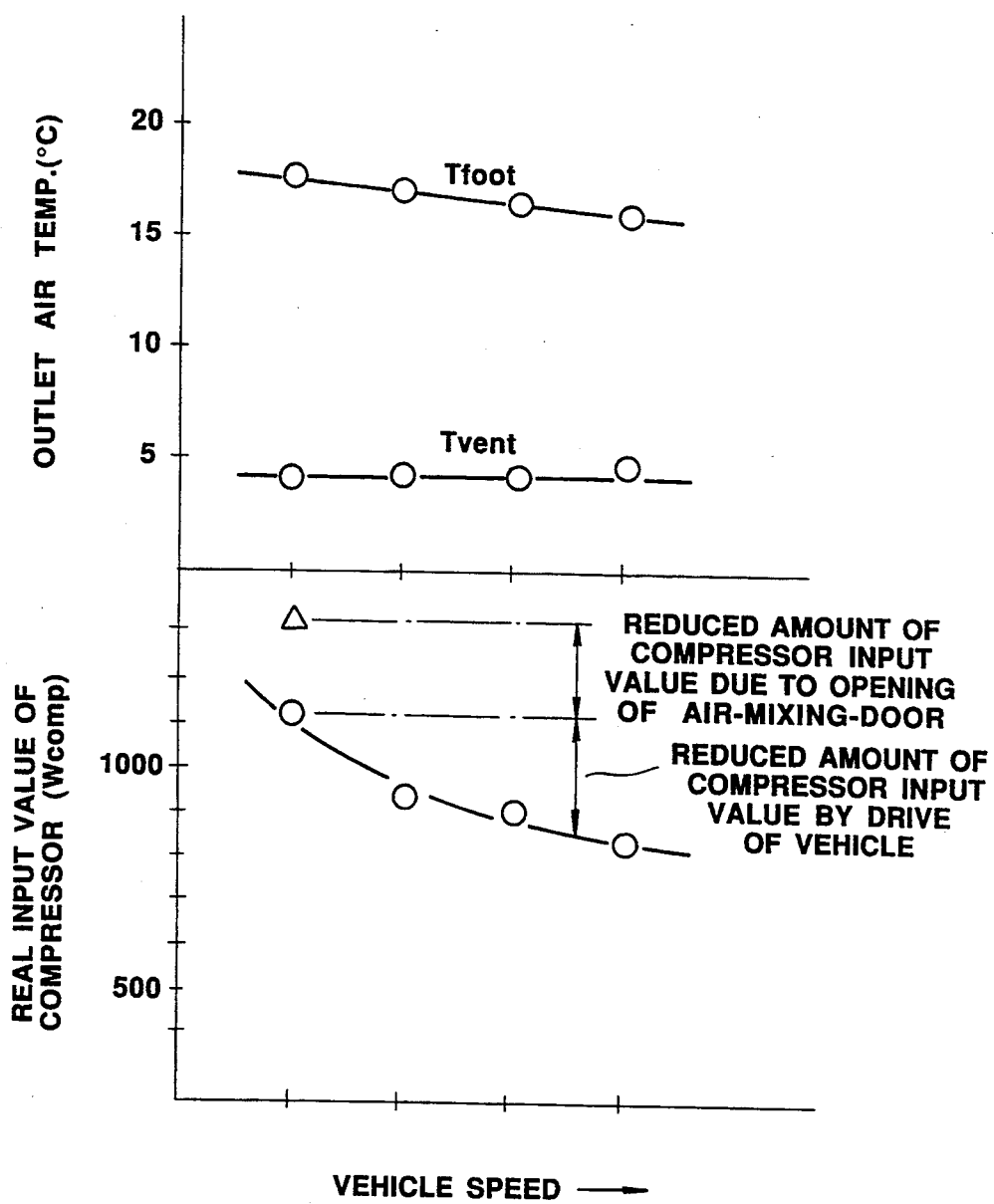
FIG. 14 is a result of the experiment under a bi-level mode of the cooling drive.

FIG. 14 shows a result of the experiment carried out under a bi-lever mode and the correction value $\delta T_1 = 6$ wherein a part of the air passing through the second inner heat exchanger 35 is supplied to the first inner heat exchanger 33 and the input value of the compressor is reduced. As similar to the case of FIG. 13, the input value is reduced by the increase of the vehicle speed. The outlet air temperature Tvent from the ventilator outlet port 51 and the outlet air temperature Tfoot from the foot outlet port 52 are constantly kept on without being effected by the vehicle speed.

The real input value Wcomp of the compressor 31 in FIG. 13 is marked by $\Delta$ marks in FIG. 14.

Figure 15:
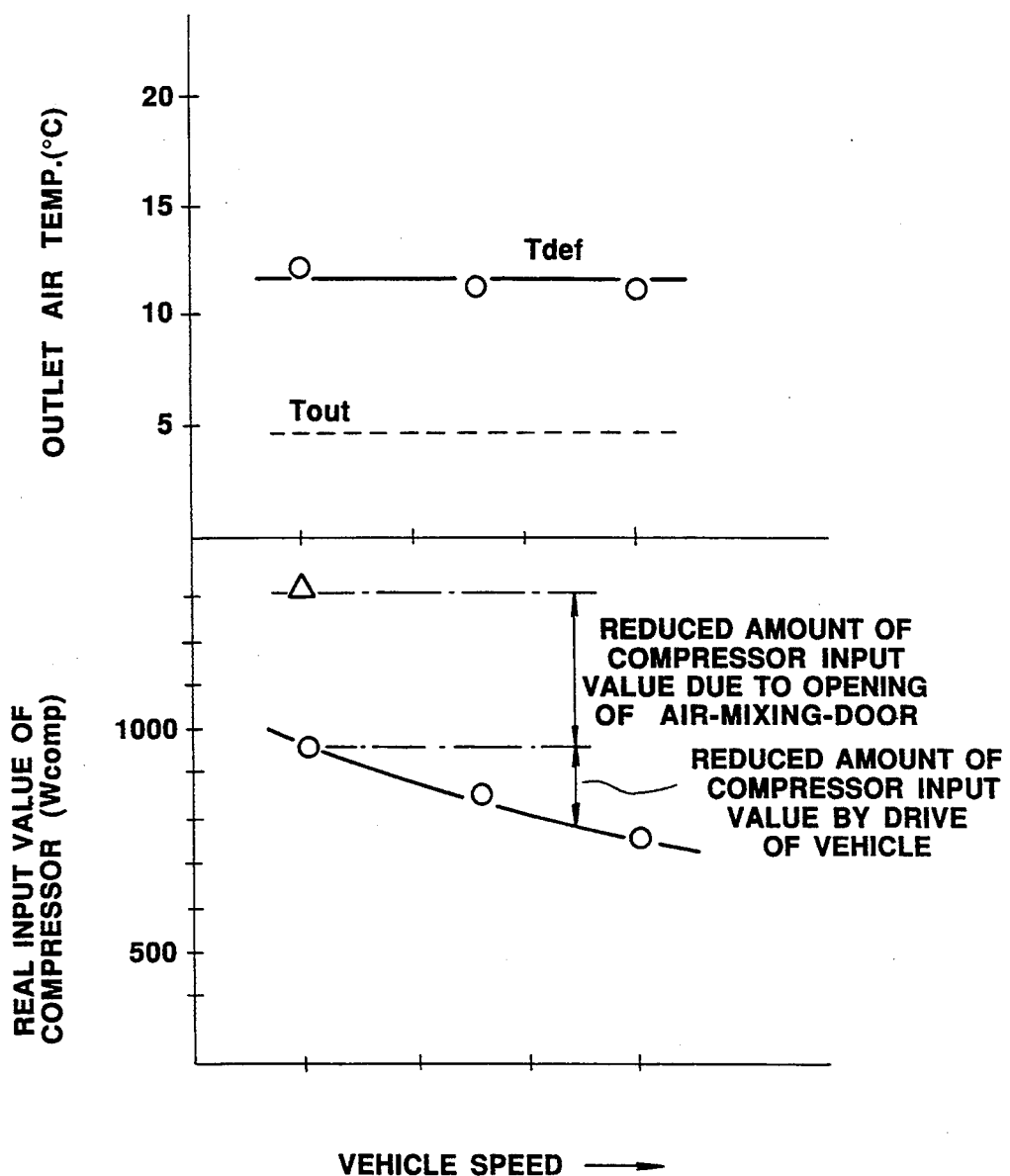
FIG. 15 is a result of the experiment under a defroster mode of the cooling drive.

FIG. 15 shows a result of the experiment in the defroster mode. A vertical line represents the outlet air temperature Tvent from the ventilator outlet port 51 and the real input value Wcomp of the compressor 31. A horizontal line represents the vehicle speed. In this experiment, the opening degree Xdsc of the air mixing door is 100% (Xdsc=100%), and the target value Tout' of the outlet air temperature Tout is 4° C. The outlet air temperature Tout of the second inner heat exchanger 35 is represented by a dotted line in FIG. 15.

As shown in FIG. 15, in the defroster mode, as same as the vent mode or bi-level mode, the outlet air temperature Tdef from the defoliator outlet port 53 is kept constant without being effected by the vehicle speed. The input power of the compressor 31 is reduced by recycling the cooling energy in a manner to open the air mixing door 46 and by the increase of the vehicle speed.

Referring to FIGS. 16 to 21, there is shown a second embodiment of the air conditioner according to the present invention.

Figure 16:
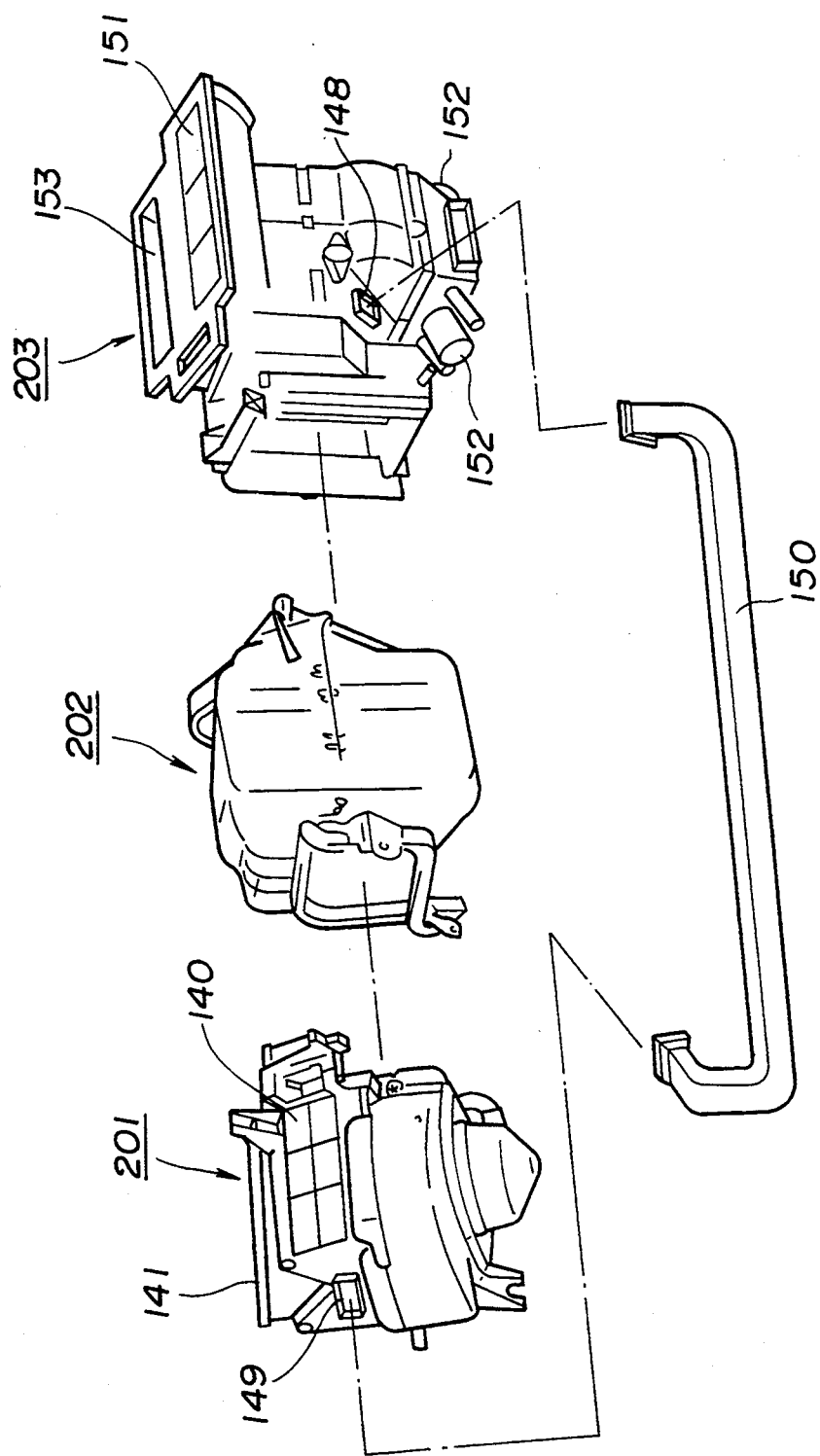
FIG. 16 is an exploded perspective view showing a structure of a second embodiment of the air conditioner according to the present invention.
Figure 17:
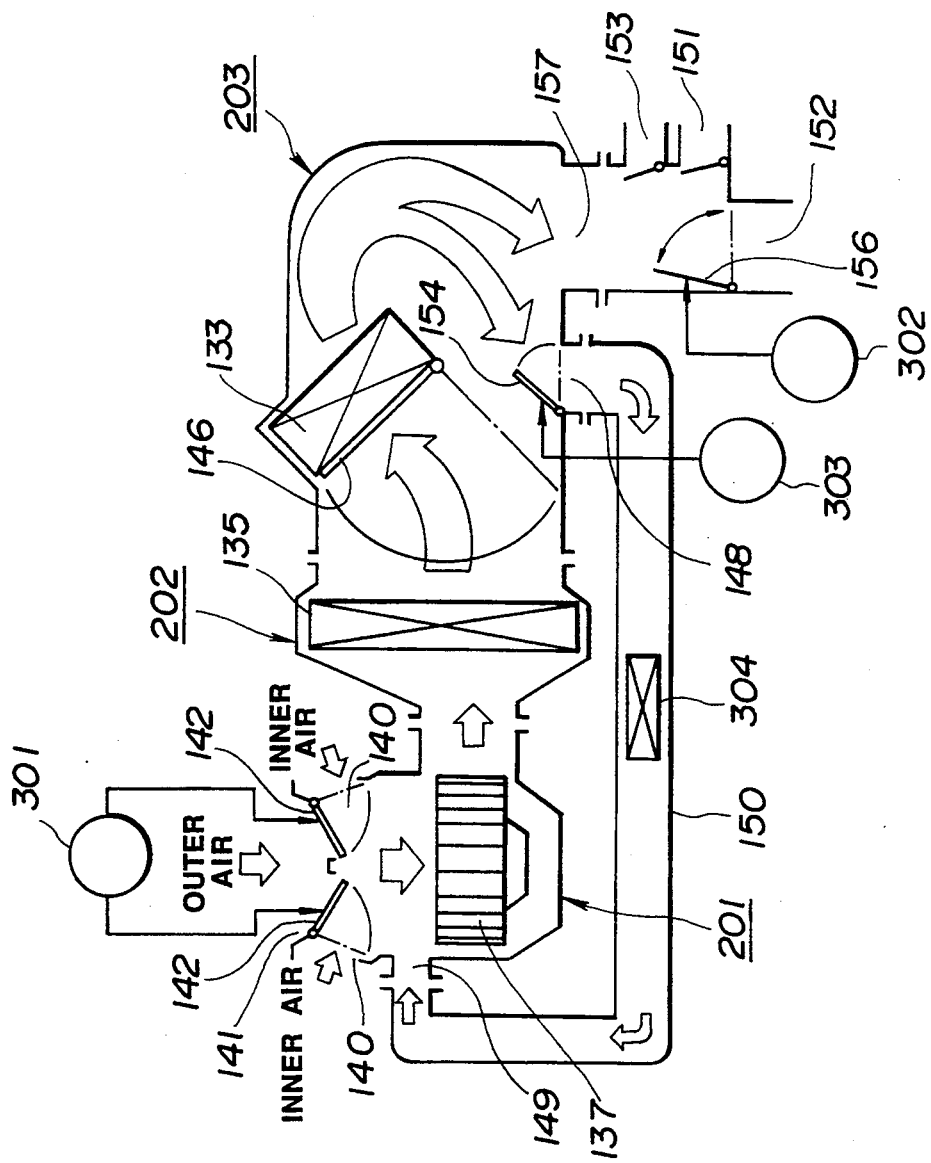
FIG. 17 is a view showing an internal constitution of the air conditioner of FIG. 16.

As shown in FIG. 16, the duct is constituted by interconnecting the blower unit 201, a cooler unit 202, a heater unit 203. The blower unit 201 is provided with a pair of inner air guide ports 140, an outer air inlet 141 for leading the ambient air outside of the passenger compartment. The ratio of the air amount let from inlets 140 and 141 is determined by the opening degree of a pair of intake doors 142. the intake doors 142 are driven by the intake door actuator 301 connected to the control unit 43.

The air led from the inlets 140 and 141 is fed to the cooler unit 202 through a blower fan 137 and fed to the heater unit 203 through the second inner heat exchanger 135. The heater unit 203 is provided with the first inner heat exchanger 133, the air mixing door 146, each outlet such as a vent outlet port 151, a foot outlet port 152, a defroster outlet port 153. A vent door 155 is disposed to open and close the vent outlet port 151, a foot door 156 is disposed to open and close the foot outlet port 151 and a defroster door 157 is disposed to open and closed the defroster door 157. The foot door 156 is arranged to be driven by the foot door actuator 302 connected to the control unit 43.

A conditioned air inlet port 148 for recirculating conditioned air to the inner air inlet 140, the vent outlet port 151, the foot outlet port 153 and a heater unit outlet 157 communicated with the defroster outlet port 153 are disposed at a part opposite to the air inlet of the first inner heat exchanger in the heater unit 203. The conditioned air inlet port 153 is connected to the recirculating duct 150 communicated with the conditioned air outlet port 149 disposed near the inner air inlet 140 of the blower unit 201. A return door 154 for opening and closing the conditioned air inlet port 148 is arranged to be driven by a return door actuator 303. A PTC thermistor (Positive Temperature Coefficient Thermistor) 304 is disposed in the recirculating duct 150 and arranged to receive an electric power from a battery (not shown) through a switch. The PTC thermistor 304 is self-heated by the application of the electric power thereto. When the temperature of the PTC thermistor reaches a predetermined temperature, the PTC thermistor 304 radically increases its resistance value and reduces the supplied electric current. Therefore, the temperature of the PTC thermistor 304 is automatically kept at a constant without be affected by the air flow rate passing through the recirculating duct 150.

A flow cycle of the refrigerant in this second embodiment is the same as that in FIG. 1 except for the reference numerals 33 and 35 are changed into 133 and 135.

Figure 18:
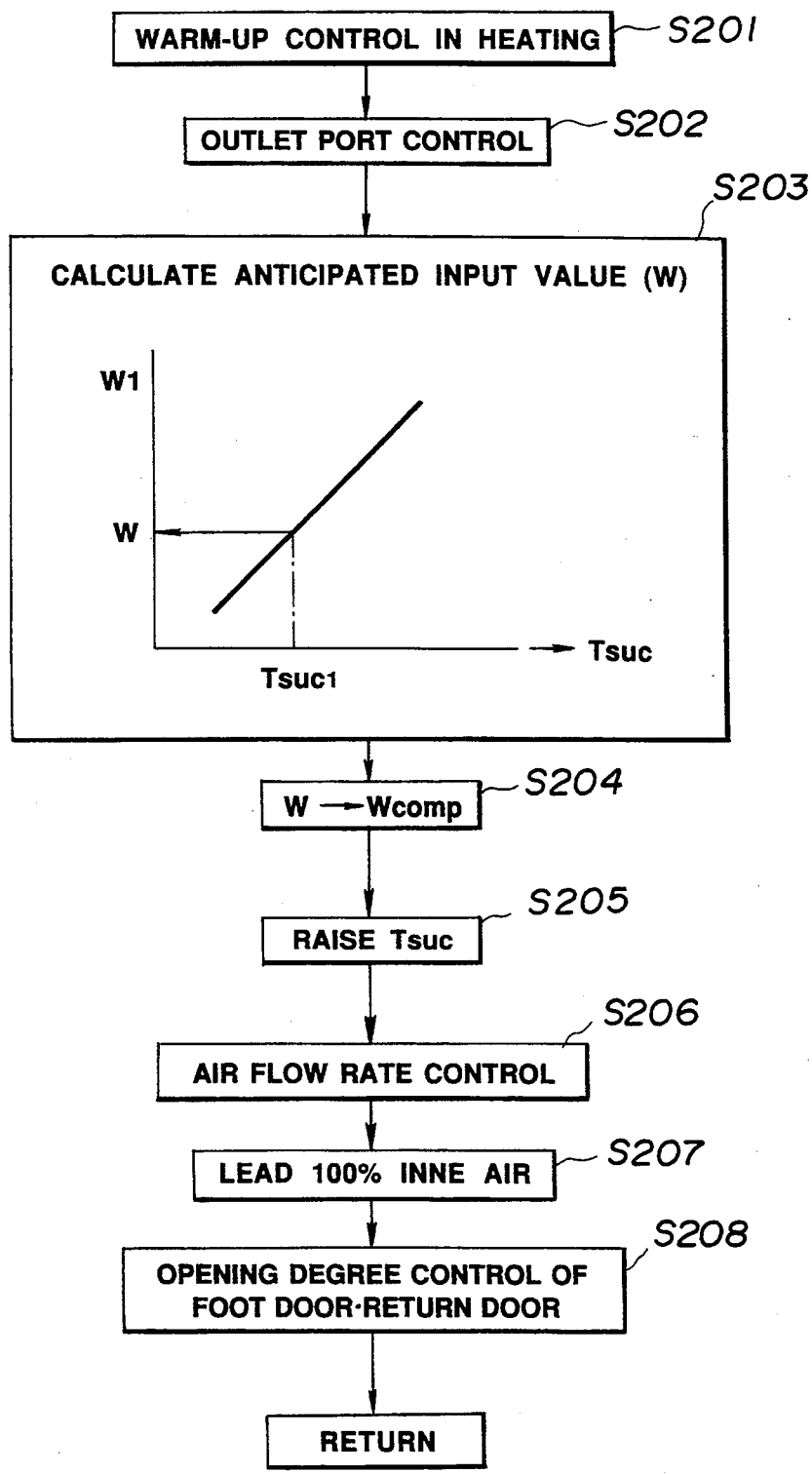
FIG. 18 is a flow chart of a warm-up control of the heating drive by the second embodiment.

FIG. 18 shows a warm-up control in heating which is generally similar to the control shown in FIG. 4 except that steps 207 and 208 are newly added.

In the step S207, the intake door 142 is driven by the intake door actuator 301 and the state of the intake door 142 is set such that inner air is fully circulated. In the step 208, the control of the opening degree of the foot door 156 and the return door 154 is carried out. During the warm-up control, the vent outlet port 151 and the defroster outlet port 153 are closed.

Figure 19:
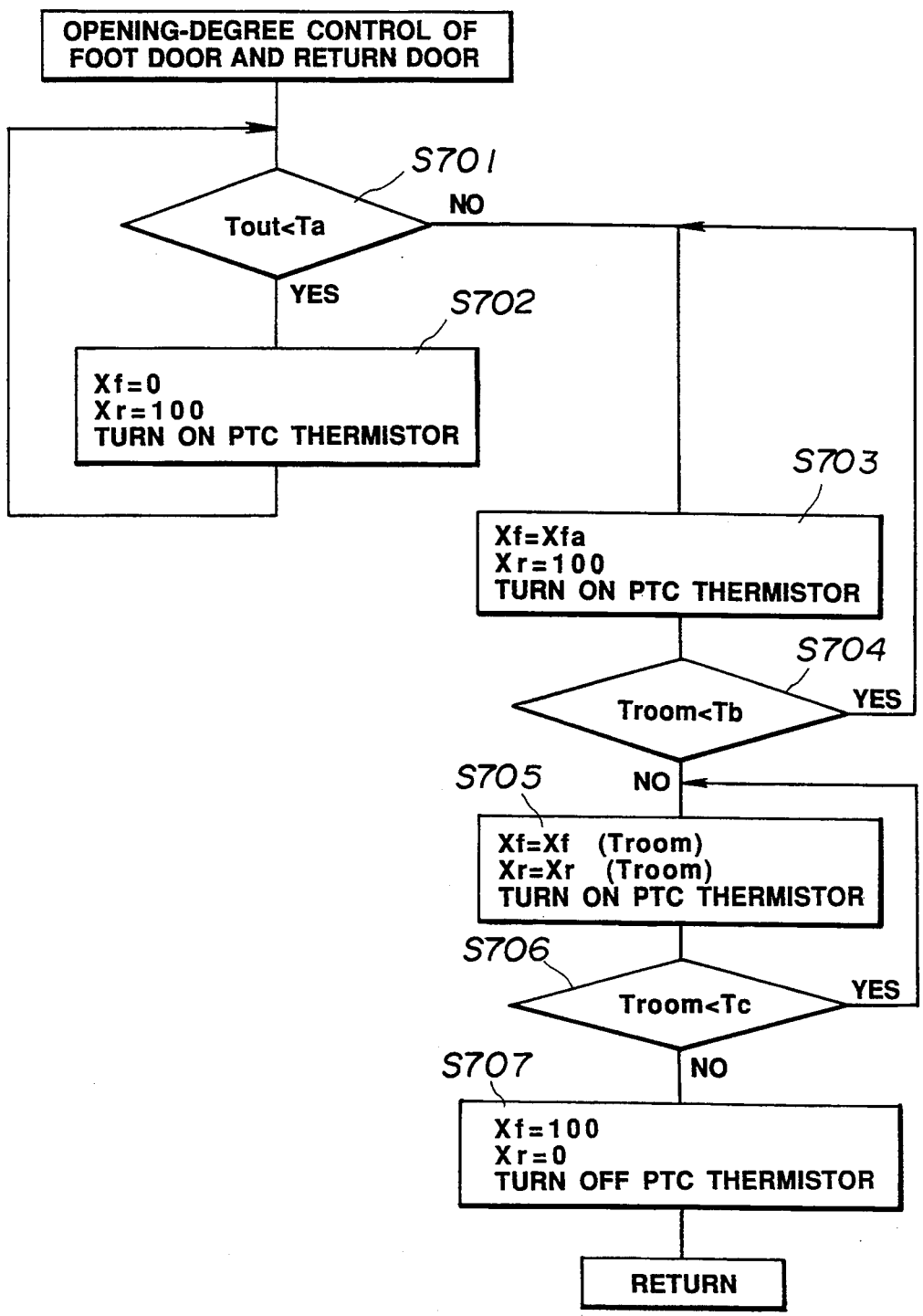
FIG. 19 is a flow chart of a control of a return door and a foot door by the second embodiment.

FIG. 19 shows a detail of the opening degree control. In a step S701, the outlet air temperature Tout of the second inner heat exchanger 135 is compared with a predetermined temperature Ta for example, a temperature from $-2°$ C. to $2°$ C. The outlet air temperature Tout is changed according to the pressure of the refrigerant while being effected by the air temperature in the units 201, 202 and 203. When Tout<Ta, the program proceeds to the step S702 wherein the opening degree Xf of the foot door 156 is set to 0% (Xf=0%), the opening degree Xr of the return door 154 is set to 100% (Xr=100%), and the switch of the PTC thermistor 304 is turned on for heating the conditioned air in the recirculating duct 150.

Since the foot door 156 is set to fully close the foot inlet port 152 and the return door 154 is set to fully open the return inlet port, the outlet air amount form the foot inlet port 152 becomes zero and almost air passing through the first inner heat exchanger 133 is recirculated to the cooler unit 202 through the blower fan 137 after being led from the conditioned air inlet port 149 to the blower fan 201 through the recirculating duct 150. Accordingly, the air led to the second inner heat exchanger 135 is heated such that its temperature is higher than that of the ambient air. In particular, since the PTC thermistor 304 is set in the recirculating duct 150, the air led to the second inner heat exchanger 135 is further heated and the outlet air temperature Tout is raised.

After the processing in the step S702 the program returns to the step S701.

On the other hand, when the judgment in the step S701 is "NO" (Tout=≧Ta), the program proceeds to a step S703 wherein the opening degree Xf of the foot door 156 is set to a predetermined opening degree Xfa (Xf=Xfa) such that the a predetermined amount of the air is blown from the foot outlet port 152. Then, the opening degree Xr of the return door is set to 100% (Xr=100%) and the PTC thermistor 304 is turned on. In a step S704, the room air temperature Troom is compared with a predetermined temperature Tb. When Troom<Tb, the program returns to the step S703. When the Troom≧Tb, the program proceeds to a step S705.

In the step S705, the opening degree Xf of the foot door 156 and the opening degree Xr of the return door 154 are changed according to the room air temperature Troom. As circumstantially shown in FIG. 20, the higher the room air temperature Troom becomes, the larger the opening degree of the foot door becomes and the smaller the opening degree of the return door becomes. In this operation, the PTC thermistor 304 is kept at a turned-on condition. With this operation, the outlet air amount from the foot outlet port 152 into the passenger compartment is gradually increased and the air amount led to the recirculating duct 150 is gradually decreased.

In a step S706, the room air temperature Troom is compared with a predetermined temperature Tc (>Tb). When Troom<Tc, the program returns to the step S705. When Troom≧Tc, the program proceeds to a step S707 wherein the opening degree Xf of the foot door 156 is set to 100% (Xf=100%), the opening degree Xr of the return door 154 is set to 0% (Xr=0%), and the PTC thermistor 304 is turned off.

Figures 20, 21:
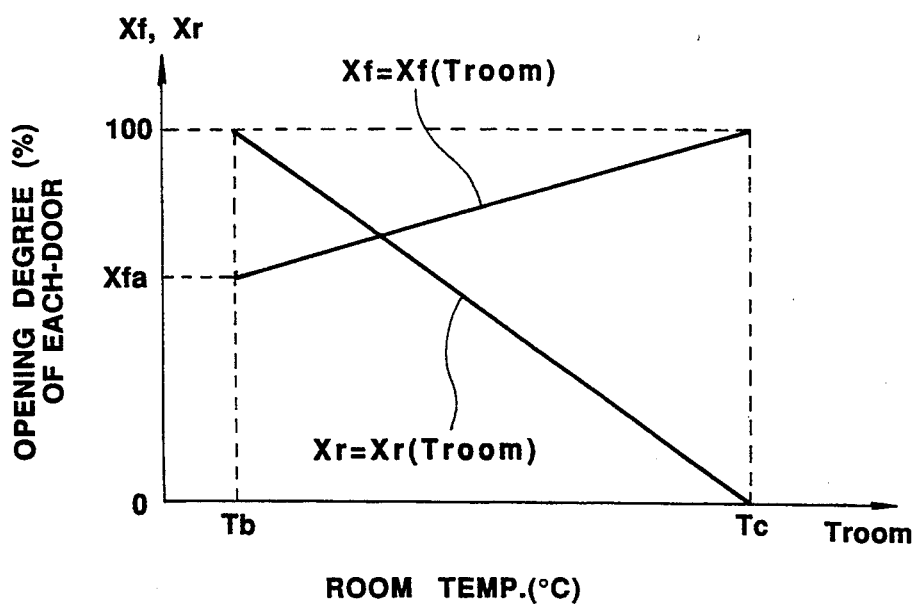
FIG. 20 is a graph showing an opening degree of the return and foot doors relative to the room air temperature.
FIG. 21 is a table showing the opening degree of the return and foot doors during the warm-up control.
Figure 22:
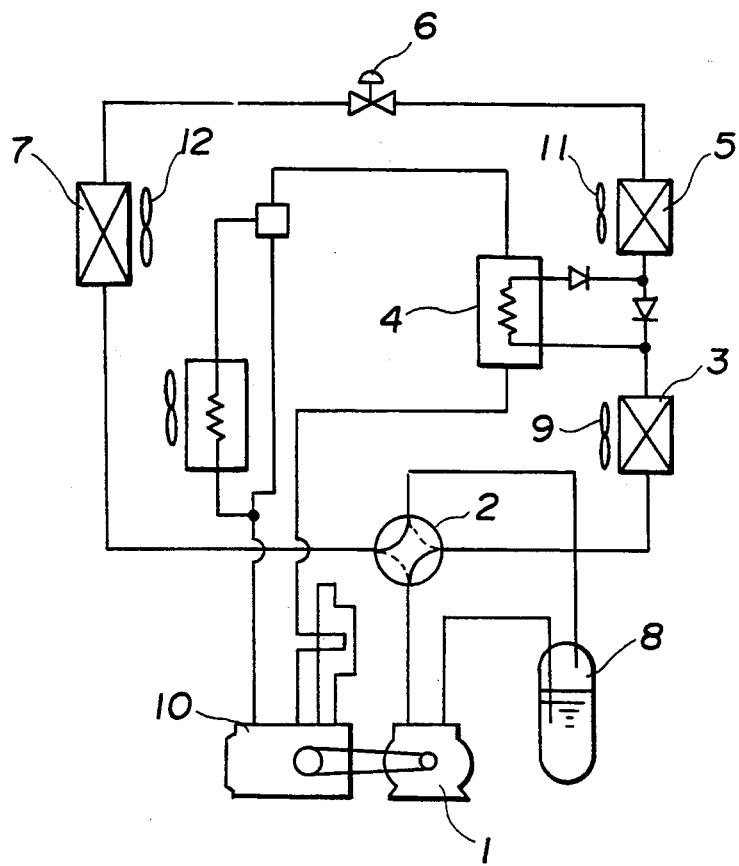
FIG. 22 is a schematic view of a conventional air conditioner.

With the thus arranged air conditioner, during a warm-up operation, air led into the blower unit 201 is fully supplied to the passenger compartment (100%). The opening degrees of the foot door 156 and the return door 154 are controlled as shown in FIG. 21. That is to say, under a condition that the outlet air temperature Tout of the second inner heat exchanger 135 is smaller than a predetermined temperature Ta just after the start of the heating drive, the foot door 156 fully closes the foot outlet port 152 and the return door 154 fully opens the return port 148. Since the foot door 156 is set at a full close condition, the cool air is prevented from being blown from the foot outlet port 152 and from applying a discomfort to the passenger. Further, since the vent door 155, the foot door 156 and the defroster door 157 are set in a full close condition and the return door 154 is set in a full open condition, the air passed through the first inner heat exchanger 133 is led to the recirculating duct 150 and led from the conditioned air inlet port 149 to the blower unit 201 while being warmed by the PTC thermistor 304. As a result, the temperature of the air sucked to the second inner heat exchanger 135 becomes higher than the ambient air temperature, and the refrigerant increases its energy. The raising of the pressure and temperature of the refrigerant causes the raising of the temperature of the outlet air from the first inner heat exchanger 33. Accordingly, if the air is once warmed, its temperature is accelerately raised. This realizes a rapid heating of the conditioned air during the heating start period.

Since the conditioned air inlet port 148 of the recirculating duct 150 is disposed at a portion opposite to the first inner heat exchanger 133, the conditioned air blown out from the first inner heat exchanger 133 is turned along a curved wall of the heater unit 203 and led to the return inlet port 148. This enables the air to smoothly flow and to decrease its pressure loss of the flowing.

When the outlet air temperature Tout becomes higher than the predetermined value Ta (early period of the warm-up control), the foot door 156 is set to open by the predetermined amount Xfa such that the warmed air by the first inner heat exchanger 133 is blown out from the foot outlet port 152 into the passenger compartment. Then, the foot door 156 is gradually opened and the return door 154 is gradually closed according to the raising of the room air temperature Troom. That is to say, since all air is led into the passenger compartment, it is not necessary to heat the air by the recirculating circuit 150 if the room air temperature becomes sufficiently high. The room air temperature Troom may be controlled by gradually closing the return door 154 and gradually opening the foot door 156. Finally, when the room air temperature reaches a predetermined value Tc, the return door 154 is fully closed, the foot door 156 is fully opened, and the PTC thermistor 304 is turned off (stable period).

In this embodiment, the outlet air temperature sensor 59 of the second inner heat exchanger serves as an outlet temperature sensor, the return door actuator 303 serves as a return door opening degree control means, the foot door actuator 302 serves as a foot door opening degree control means, and the control unit 34 serves as a control means.

With the thus arranged air conditioner, during the warm-up period the first inner heat exchanger is used as a radiator and the second inner heat exchanger is used as a heat absorber. During the cooling drive, only the outer heat exchanger or both the outer heat exchanger and the first inner heat exchanger is used as a radiator, and the air led to the air conditioner is heated by the first inner heat exchanger after being dehumidified by the second inner heat exchanger. Accordingly, the air-conditioning capacity of this air conditioner is improved and even when it is in the heating drive necessary to humidify, the air-conditioning capacity is kept on. Furthermore, since it is not necessary to carry out a defrost drive, it becomes possible to continuously drive this air conditioner. Additionally, since the flowing direction of the refrigerant is the same during the cooling drive and the heating drive, a conduit and refrigerant applied to a conventional air conditioner can be used without changing conduits.

Further, with the thus arranged air conditioner, it becomes possible that the room air temperature is further rapidly raised in a manner to provide means for heating inlet air or to recirculate part of the heated air by passing through the first inner heat exchanger to the air inlet side of the second inner heat exchanger while the second inner heat exchanger is disposed downstream of the blower fan and the first inner heat exchanger is disposed downstream of the second inner heat exchanger.

Additionally, the air led to the second inner heat exchanger can be heated to be higher than ambient temperature. Therefore, even if this air conditioner is applied to a vehicle having no heat source such as a solar car or electric vehicle, the rapid raising of the room air temperature is realized even under an extremely cold ambient temperature. Furthermore, since a sufficient heating capacity is obtained without increasing a radiating amount of the first inner heat exchanger, it is not necessary to increase a heat absorbing capacity of the second inner heat exchanger. This prevents the freezing of the second inner heat exchanger.

While a PTC thermistor is disposed in the recirculating duct in this embodiment of the air conditioner according the present invention, it will be understood that a heater of the other types may be applied to the recirculating duct. Furthermore, although the all air is guided into the passenger compartment during the warm-up control, it will be understood that a predetermined amount of the ambient air may be led into the passenger compartment.

Additionally, it will be understood that the outlet temperature sensors 67 of the first inner heat exchanger 33 or the inlet air temperature sensor 58 of the second inner heat exchanger 35 may be used as an outlet air temperature sensor instead of the outlet air temperature sensor 59 of the second inner heat exchanger 35, and a new temperature sensor may be disposed to one of the recirculating duct 105, the blower unit 201, the cooler unit 202, the heater unit 203.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A heat pump type air conditioner for an automotive vehicle, comprising:
   refrigerant;
   a compressor applying a workload to compress said refrigerant;
   an outer heat exchanger connected to a refrigerant discharge side of said compressor and radiating heat from the compressed refrigerant to ambient air;

a blower for generating a flow of air for air-conditioning a passenger compartment of the automotive vehicle;

a first inner heat exchanger connected in series to an outlet side of said outer heat exchanger to receive refrigerant therefrom and to transmit heat from said refrigerant to the air flow generated by said blower;

an expansion valve connected to a refrigerant outlet side of said first inner heat exchanger;

a second inner heat exchanger connected to a refrigerant outlet side of said expansion valve, said second inner heat exchanger cooling the air flow generated by said blower by transmitting heat from the air to refrigerant supplied to said second inner heat exchanger, through said expansion valve from at least one of said outer heat exchanger and said first inner heat exchanger; and a switching valve connected to the refrigerant discharge side of said compressor, a refrigerant inlet side of said outer heat exchanger and a refrigerant inlet side of said first inner heat exchanger, said switching valve being connected to convey said compressed refrigerant from said compressor to said outer heat exchanger so that the refrigerant flows serially through the compressor, the switching valve, the outer heat exchanger and the first inner heat exchanger during a cooling drive, said switching valve also being connected to lead said compressed refrigerant from said compressor to said first inner heat exchanger so that said compressed refrigerant bypasses said outer heat exchanger during a heating drive.

2. A heat pump type air conditioner as claimed in claim 1, wherein:

said second inner heat exchanger and said first inner heat exchanger are disposed downstream of the said blower and said first inner heat exchanger is disposed downstream of said second inner heat exchanger.

3. A heat pump type air conditioner as claimed in claim 2, further comprising:

means for raising a temperature of the air flow to said second inner heat exchanger to a value higher than that of the ambient air temperature.

4. A heat pump type air conditioner for an automotive vehicle, comprising:

refrigerant;

a compressor applying a workload to compress said refrigerant;

an outer heat exchanger connected to a refrigerant discharge side of said compressor and radiating heat from the compressed refrigerant to ambient air;

a blower for generating a flow of air for air-conditioning a passenger compartment of the automotive vehicle;

a first inner heat exchanger connected to an outlet side of said outer heat exchanger to receive refrigerant therefrom and to transmit heat from said refrigerant to the air flow generated by said blower;

an expansion valve connected to a refrigerant outlet side of said first inner heat exchanger;

a second inner heat exchanger connected to a refrigerant outlet side of said expansion valve, said second inner heat exchanger cooling the air flow generated by said blower by transmitting heat from the air to refrigerant supplied to said second inner heat exchanger, through said expansion valve from at least one of said outer heat exchanger and said first inner heat exchanger;

a switching valve connected to the refrigerant discharge side of said compressor, a refrigerant inlet side of said outer heat exchanger and a refrigerant inlet side of said first inner heat exchanger, said switching valve being connected to convey said compressed refrigerant from said compressor to said outer heat exchanger during a cooling drive, said switching valve also being connected to lead said compressed refrigerant from said compressor to said first inner heat exchanger so that said compressed refrigerant bypasses said outer heat exchanger during a heating drive; and means for raising a temperature of the air flow to said second inner heat exchanger to a value higher than that of the ambient air temperature, wherein said second inner heat exchanger and said first inner heat exchanger are disposed downstream of the said blower and said first inner heat exchanger is disposed downstream of said second inner heat exchanger, and said temperature raising means includes a conditioned air inlet disposed downstream of said first inner heat exchanger, a return door for opening and closing the conditioned air inlet and a recirculating duct connecting the conditioned air inlet to an inlet side of said blower.

5. A heat pump type air conditioner as claimed in claim 4, further comprising:

means for detecting signals indicative of a pressure and a temperature of the refrigerant.

6. A heat pump type air conditioner as claimed in claim 5, further comprising:

means for changing a state of the return door and for selecting an outlet port for blowing the conditioned air into the passenger compartment.

7. A heat pump type air conditioner as claimed in claim 6, further comprising:

an outlet temperature sensor for detecting a temperature of the air flow generated by said blower, a temperature sensor for detecting a temperature in the passenger compartment, means for controlling an opening degree of the return door, a foot door for closing and opening a foot outlet port disposed downstream of said first inner heat exchanger, means for controlling an opening degree of the foot door, intake-means for controlling an amount of ambient air flowing to said blower means and an amount of air flowed into the passenger compartment, opening degree control means for controlling an opening degree of the return door according to at least one of the temperature of the air flow generated by said blower and the temperature in the passenger compartment, and control means for controlling said foot door opening degree control means and said intake means.

8. A heat pump type air conditioner as claimed in claim 7, wherein:

said control means includes an intake control section which controls said intake means such that the intake air amount is larger than a predetermined amount at a start of a heating, and a door control means which controls the return door opening degree control means and the foot door opening degree control means such that the return door is fully opened and the foot door is fully closed when the temperature of the air flow generated by said blower is lower than a predetermined temperature and such that the return door is gradually closed and the foot door is gradually opened according to an increase of the room air temperature when the temperature of the air flow generated by the blower means is higher than or equal to the predetermined temperature.

9. A heat pump type air conditioner for an automotive vehicle, comprising:

refrigerant;

a compressor applying a workload to compress said refrigerant;

an outer heat exchanger connected to a refrigerant discharge side of said compressor and radiating heat from the compressed refrigerant to ambient air;

a blower for generating a flow of air for air-conditioning a passenger compartment of the automotive vehicle;

a first inner heat exchanger connected to an outlet side of said outer heat exchanger to receive refrigerant therefrom and to transmit heat from said refrigerant to the air flow generated by said blower;

an expansion valve connected to a refrigerant outlet side of said first inner heat exchanger;

a second inner heat exchanger connected to a refrigerant outlet side of said expansion valve, said second inner heat exchanger cooling the air flow generated by said blower by transmitting heat from the air to refrigerant supplied to said second inner heat exchanger, through said expansion valve from at least one of said outer heat exchanger and said first inner heat exchanger;

a switching valve connected to the refrigerant discharge side of said compressor, a refrigerant inlet side of said outer heat exchanger and a refrigerant inlet side of said first inner heat exchanger, said switching valve being connected to convey said compressed refrigerant from said compressor to said outer heat exchanger during a cooling drive, said switching valve also being connected to lead said compressed refrigerant from said compressor to said first inner heat exchanger so that said compressed refrigerant bypasses said outer heat exchanger during a heating drive; and a temperature sensor for detecting a temperature of the air flow to said second inner heat exchanger and means for calculating an anticipated workload of said compressor on the basis of signals detected by said air temperature sensor both when the compressor is operating and when it is not, and means for driving said compressor according to the calculated workload of said compressor, wherein said second inner heat exchanger and said first inner heat exchanger are disposed downstream of the said blower and said first inner heat exchanger is disposed downstream of said second inner heat exchanger.

10. A heat pump type air conditioner for an automotive vehicle, comprising:

refrigerant;

a compressor applying a workload to compress said refrigerant;

an outer heat exchanger connected to a refrigerant discharge side of said compressor and radiating heat from the compressed refrigerant to ambient air;

a blower for generating a flow of air for air-conditioning a passenger compartment of the automotive vehicle;

a first inner heat exchanger connected to an outlet side of said outer heat exchanger to receive refrigerant therefrom and to transmit heat from said refrigerant to the air flow generated by said blower;

an expansion valve connected to a refrigerant outlet side of said first inner heat exchanger;

a second inner heat exchanger connected to a refrigerant outlet side of said expansion valve, said second inner heat exchanger cooling the air flow generated by said blower by transmitting heat from the air to refrigerant supplied to said second inner heat exchanger, through said expansion valve from at least one of said outer heat exchanger and said first inner heat exchanger;

a switching valve connected to the refrigerant discharge side of said compressor, a refrigerant inlet side of said outer heat exchanger and a refrigerant inlet side of said first inner heat exchanger, said switching valve being connected to convey said compressed refrigerant from said compressor to said outer heat exchanger during a cooling drive, said switching valve also being connected to lead said compressed refrigerant from said compressor to said first inner heat exchanger so that said compressed refrigerant bypasses said outer heat exchanger during a heating drive; and an air mixing door disposed at the air-inlet side of said first inner heat exchanger and means for controlling the opening degree of said air mixing door, wherein said second inner heat exchanger and said first inner heat exchanger are disposed downstream of the said blower and said first inner heat exchanger is disposed downstream of said second inner heat exchanger.

11. A heat pump type air conditioner for an automotive vehicle, comprising:

refrigerant;

a compressor applying a workload to said refrigerant;

an outer exchanger connected to a refrigerant discharge side of said compressor and radiating heat from the refrigerant into ambient air;

a blower generating an air flow for air-conditioning a passenger compartment of the automotive vehicle;

a first inner heat exchanger connected in series to an outlet side of said outer heat exchanger and transferring heat from said refrigerant to the air flow generated by said blower;

an expansion valve connected to a refrigerant outlet side of said first inner heat exchanger;

a second inner heat exchanger connected to a refrigerant outlet side of said expansion valve, said second inner heat exchanger cooling the air flow generated by said blower by transferring heat from air flow to said refrigerant, said refrigerant being supplied to the second inner heat exchanger through said expansion valve from at least one of said outer heat exchanger and said first inner heat exchanger; and a switching valve connected to communicate with the refrigerant discharge side of said compressor, a refrigerant inlet side of said outer heat exchanger, and a refrigerant inlet side of said first inner heat exchanger, said switching valve being set at one of a first state in which said compressor provides refrigerant via said outer heat exchanger and then through the first inner heat exchanger and a second state in which said compressor provides refrigerant to said first inner heat exchanger while bypassing the outer heat exchanger.

12. A heat pump type air conditioner for an automotive vehicle, comprising:

refrigerant;

a compressor applying a workload to said refrigerant;

an outer heat exchanger connected to a refrigerant discharge side of said compressor and radiating heat from the refrigerant to ambient air;

a blower generating an air flow for air-conditioning a passenger compartment of the automotive vehicle;

a first inner heat exchanger connected to a refrigerant outlet side of said outer heat exchanger to be in series therewith in a cooling drive operational mode and transferring heat from said refrigerant to the air flow;

an expansion valve connected to a refrigerant outlet side of said first inner heat exchanger;

a second inner heat exchanger connected to a refrigerant outlet side of said expansion valve, said second inner heat exchanger cooling the air flow by transferring heat from the air flow to said refrigerant, said refrigerant being supplied to said second inner heat exchanger through said expansion valve from at least one of said outer heat exchanger and said first inner heat exchanger, a refrigerant outlet side of said second inner heat exchanger being connected to a refrigerant inlet side of said compressor; and a bypass means for preventing said refrigerant from flowing through said outer heat exchanger during a heating drive.

13. A heat pump type air conditioner as claimed in claim 12, wherein:

said bypass means connects said compressor and said first inner heat exchanger during the heating drive.

14. A heat pump type air conditioner as claimed in claim 12, wherein:

during the heating drive the refrigerant from said compressor is supplied to said first inner heat exchanger without flowing through said outer heat exchanger.

* * * * *